US010404950B2

(12) United States Patent
Mali et al.

(10) Patent No.: US 10,404,950 B2
(45) Date of Patent: Sep. 3, 2019

(54) APPARATUS AND METHOD FOR DETECTING OBJECTS

(71) Applicant: iMerciv Inc., Toronto (CA)

(72) Inventors: Arjun Mali, Toronto (CA); Bin Liu, Toronto (CA); Robert Dickie, King city (CA); Chris Pearen, King City (CA)

(73) Assignee: iMerciv Inc., Toronto, Ontario (CA)

( * ) Notice: Subject to any disclaimer, the term of this patent is extended or adjusted under 35 U.S.C. 154(b) by 964 days.

(21) Appl. No.: 14/931,272

(22) Filed: Nov. 3, 2015

(65) Prior Publication Data

US 2016/0127698 A1 May 5, 2016

Related U.S. Application Data

(60) Provisional application No. 62/074,818, filed on Nov. 4, 2014.

(51) Int. Cl.
*H04N 7/18* (2006.01)
*A61H 3/06* (2006.01)
(Continued)

(52) U.S. Cl.
CPC ............ *H04N 7/185* (2013.01); *A61H 3/061* (2013.01); *G01C 3/08* (2013.01); *G01S 7/4813* (2013.01);
(Continued)

(58) Field of Classification Search
CPC .... H04N 7/185; G09B 21/003; G09B 21/001; G01S 17/023; G01S 17/026; G01S 17/88;
(Continued)

(56) References Cited

U.S. PATENT DOCUMENTS 4,858,125 A   8/1989 Washizuka et al.
5,687,136 A * 11/1997 Borenstein ............ A61H 3/061
              367/116
(Continued)

FOREIGN PATENT DOCUMENTS

DE          198 53 915 A1    5/2000
DE    20 2005 017 620 U1    3/2006
(Continued)

OTHER PUBLICATIONS

Extended European Search Report (EESR) for corresponding European patent application EP 15857282, dated May 14, 2018.
(Continued)

*Primary Examiner* — David P Porta
*Assistant Examiner* — Gisselle Gutierrez
(74) *Attorney, Agent, or Firm* — Bereskin & Parr LLP/S.E.N.C.R.L., s.r.l.; Tony Orsi

(57) ABSTRACT

Various embodiments are described herein for an electronic device and associated method for detecting potential objects in the vicinity of the electronic device. In one example embodiment, the electronic device may comprise a transceiver arm including a transceiver for transmitting source signals and receiving response signals potentially indicating at least one object in the vicinity of the user, a main body that is pivotally connected to the transceiver arm to releasably mount to an article of the user during use and include at least one processing unit for generating a feedback control signal indicating when there is at least one detected potential object in the vicinity of the user based on the response signals; and a transducer movably coupled to the main body for providing feedback to the user based on the feedback control signal when there is at least one detected potential object in the vicinity of the user.

20 Claims, 26 Drawing Sheets

(51) Int. Cl.
*G09B 21/00* (2006.01)
*G01S 15/08* (2006.01)
*G01S 17/08* (2006.01)
*G01C 3/08* (2006.01)
*G01S 17/02* (2006.01)
*G01S 17/88* (2006.01)
*G01S 15/02* (2006.01)
*G01S 7/481* (2006.01)
*G01S 7/521* (2006.01)
*G01S 15/04* (2006.01)
*G01S 15/88* (2006.01)

(52) U.S. Cl.
CPC ............ *G01S 7/521* (2013.01); *G01S 15/025* (2013.01); *G01S 15/04* (2013.01); *G01S 15/08* (2013.01); *G01S 15/88* (2013.01); *G01S 17/023* (2013.01); *G01S 17/026* (2013.01); *G01S 17/08* (2013.01); *G01S 17/88* (2013.01); *G09B 21/001* (2013.01); *G09B 21/003* (2013.01); *A61H 2003/063* (2013.01); *A61H 2201/0207* (2013.01); *A61H 2201/5058* (2013.01); *A61H 2201/5097* (2013.01)

(58) Field of Classification Search
CPC ...... G01S 7/4813; G01S 15/025; G01S 15/88; G01S 15/04; G01S 7/521; G01S 17/08; G01S 15/08; G01C 3/08; A61H 3/061; A61H 2003/063; A61H 2201/5058; A61H 2201/5097; A61H 2201/0207
USPC ..................................... 250/341.8
See application file for complete search history.

(56) References Cited

U.S. PATENT DOCUMENTS

| | | |
|---|---|---|
| 6,011,754 A | 1/2000 | Burgess et al. |
| 6,671,226 B1 | 12/2003 | Finkel et al. |
| 7,679,996 B2 | 3/2010 | Gross |
| 7,755,744 B1 | 7/2010 | Leberer |
| 7,778,112 B2 | 8/2010 | Behm et al. |
| 2004/0030383 A1 | 2/2004 | Havey et al. |
| 2009/0025765 A1 | 1/2009 | Behm et al. |
| 2009/0028003 A1 | 1/2009 | Berm et al. |
| 2012/0092460 A1 | 4/2012 | Mahoney |
| 2012/0119920 A1 | 5/2012 | Sallop et al. |
| 2013/0044005 A1 | 2/2013 | Foshee et al. |
| 2013/0113601 A1 | 5/2013 | San Luis et al. |
| 2013/0220392 A1 | 8/2013 | Gassert et al. |
| 2014/0184384 A1 | 7/2014 | Zhu et al. |

FOREIGN PATENT DOCUMENTS

| | | |
|---|---|---|
| DE | 10 2008 039 153 A1 | 2/2010 |
| EP | 3215865 A1 | 9/2017 |
| WO | 2014066516 A1 | 5/2014 |
| WO | 2016070268 A1 | 5/2016 |

OTHER PUBLICATIONS

Merciv Technologies. Empowering those with vision loss. Flyer. Apr. 2015.
Jameson, B.; Manduchi, R. "Watch your head: A wearable collision warning system for the blind," in Sensors, 2010 IEEE, vol., No., pp. 1922-1927, Nov. 1-4, 2010.
International Search Report (including Written Opinion) in relation to corresponding PCT/CA2015/051123, dated Jan. 20, 2016.

* cited by examiner

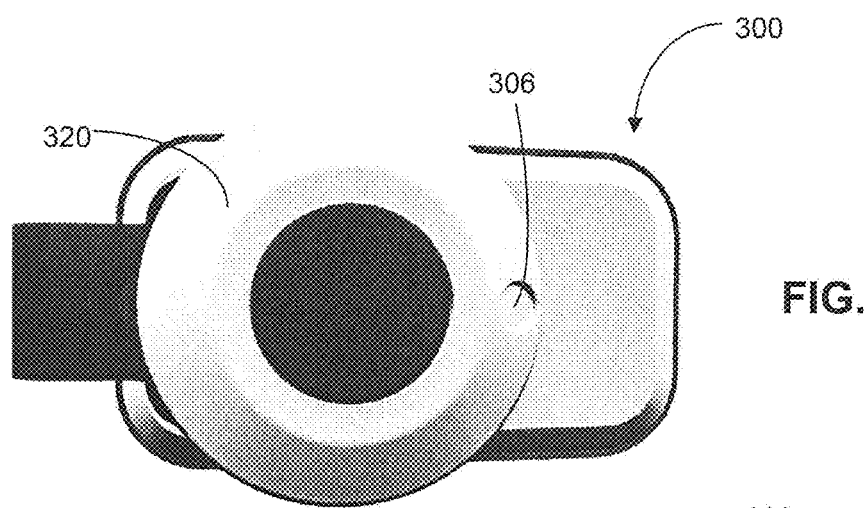
FIG. 23A
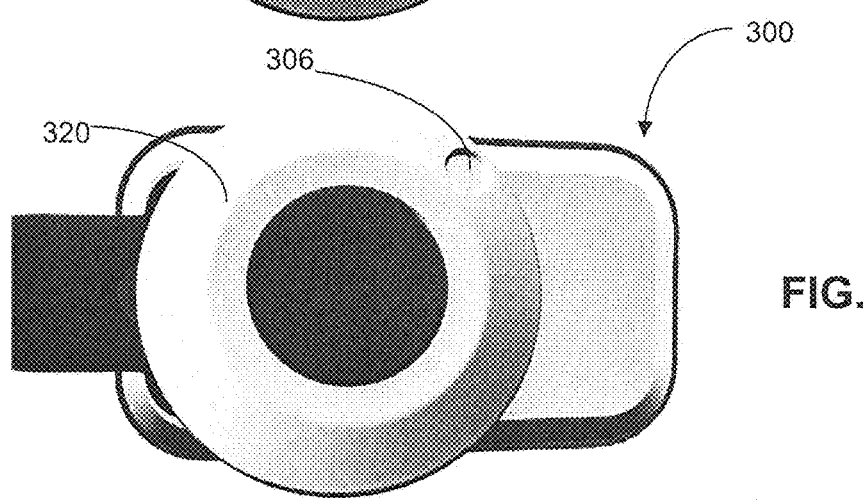
FIG. 23B
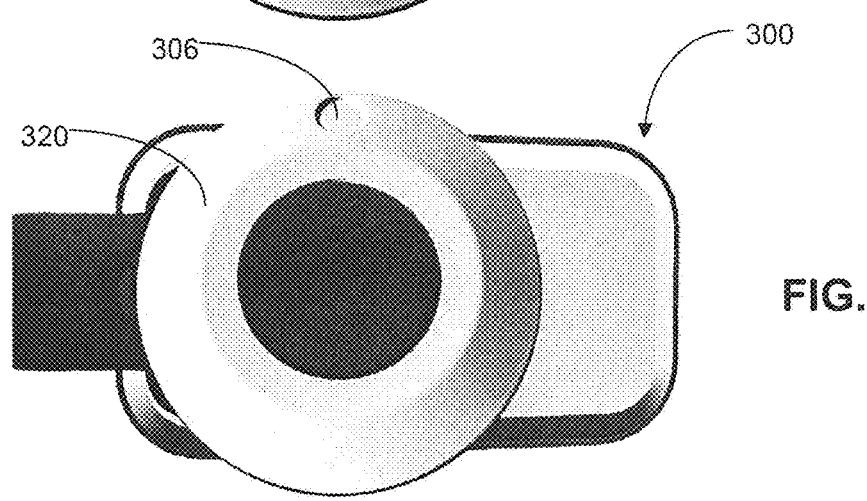
FIG. 23C
FIG. 23

APPARATUS AND METHOD FOR DETECTING OBJECTS

CROSS-REFERENCE TO RELATED APPLICATION

This application claims priority from U.S. provisional patent application No. 62/074,818, filed Nov. 4, 2014 entitled "APPARATUS AND METHOD FOR DETECTING OBJECTS", the disclosure of which is incorporated herein, in its entirety, by reference.

FIELD

The present disclosure relates to the field of detecting objects to aid the visually impaired or blind.

INTRODUCTION

Vision impairment significantly impacts one's quality of life. General mobility proves to be the single greatest daily challenge for those with vision impairment because one's spatial and directional awareness as well as their ability to detect objects are impaired. Common tasks such as getting dressed, moving around indoors, and commuting to work are challenging for someone with vision impairment.

The issue of limited mobility has compounding effects. Blind or severely visually impaired individuals suffer from social isolation, are associated with higher levels of depression, have a limited choice of recreational activities available to them and experience twice the risk of falls and accidents compared to those with vision.

Vision impairment is also a large burden for society. According to the Canadian National Institute for the Blind (CNIB) and the Canadian Ophthalmological Society, the financial cost of vision loss in Canada was $15.8 billion in 2007. This figure includes $700 million dollars for care and rehabilitation, and $4.4 billion for lost productivity. Furthermore, sixty-five percent (65%) of severely visually impaired individuals in Canada are unemployed.

Although accessibility technologies such as braille devices, audio books, and magnifiers are well established, the mobility and navigational needs of severely visually impaired individuals are markedly under served.

SUMMARY

In a broad aspect, at least one embodiment described herein provides an electronic device for detecting potential objects in the vicinity of a user of the electronic device. The electronic device may comprise a transceiver arm including a transceiver configured to transmit source signals in the vicinity of the user and to receive response signals potentially indicating at least one object in the vicinity of the user; a main body that is pivotally connected to the transceiver arm to releasably clamp to an article of the user during use, the main body including at least one processing unit for processing the response signals to detect if there is at least one potential object in the vicinity of the user and to generate a feedback control signal indicating when there is at least one detected potential object; and a transducer movably coupled to the main body and configured to receive the feedback control signal and provide feedback to the user when the feedback control signal indicates that there is at least one detected potential object in the vicinity of the user.

In at least one embodiment, the transducer may be disposed on at least one transducer arm that is movably coupled to a portion of the main body, the at least one transducer arm being disposed towards the user.

In at least one embodiment, the at least one transducer arm may be configured to isolate the transceiver from the feedback provided by the transducer.

In at least one embodiment, the at least one transducer arm may be coupled to the main body by a spring that biases the at least one transducer arm towards the user and compensates for different articles worn by the user that place the main body at different distances from a portion of the user's body.

In at least one embodiment, the at least one transducer arm may be coupled to the main body with an orientation that prevents an article of the user from gathering between inner surfaces of the at least one transducer arm and the main body that face one another when clamped to the article of the user.

In at least one embodiment, the transducer may be positioned relative to the main body in a location that provides balanced weight distribution of the electronic device when the electronic device is clamped to an article of the user so that the electronic device hangs in a neutral position towards the user.

In at least one embodiment, the electronic device may further comprise a mechanism to maintain the at least one transducer arm in a locked position relative to the main body.

In at least one embodiment, the transceiver arm may be coupled to the main body by a spring that biases the transceiver arm towards the main body thereby providing a clamping function.

In at least one embodiment, the electronic device may further comprise a mechanism to maintain the transceiver arm in a locked position relative to the main body.

In at least one embodiment, the surfaces of at least one of the transceiver arm and the main body that face one another may comprise a textured surface pattern to grip the article of the user therebetween during use.

In at least one embodiment, the transceiver arm may be disposed on the exterior of the article of the user and has a shorter length than the main body so that the transceiver arm is visually discreet.

In at least one embodiment, the main body may further comprise a electrical energy storage component for providing power to circuit components of the electronic device; and the electrical energy storage component is rechargeable by at least one of a wireless mechanism and a wired mechanism.

In at least one embodiment, the transceiver may comprise at least one of an ultrasound transmitter configured to transmit ultrasound waves as the source signals and at least one of an ultrasound sensor for receiving reflected ultrasound waves as the response signals; at least one of an infrared transmitter configured to transmit infrared waves as the source signals and at least one of an infrared sensor for receiving reflected infrared waves as the response signals; or at least one of a laser transmitter configured to transmit laser pulses as the source signals and at least one of a laser sensor for receiving reflected laser pulses as the response signals.

In at least one embodiment, the at least one processing unit may be configured to operate the electronic device in a current operating mode; the current operating mode comprising one of a plurality of operating modes comprising a first distance detection mode, a second distance detection mode, and an energy conservation mode.

In at least one embodiment, the electronic device may further comprise a selection mechanism to change the current operating mode to a different operating mode.

In at least one embodiment, the at least one processing unit may be configured to operate the electronic device in a current operating mode; the current operating mode comprising one of a plurality of operating modes comprising a first distance detection mode, a second distance detection mode, and an energy conservation mode; and the electronic device may further comprise a selection mechanism to change the current operating mode to a different operating mode.

In at least one embodiment, the source signals may be modified based on the operating mode of the electronic device so that the source signals are generated to have a first frequency in a first distance detection mode, the source signals are generated to have a second frequency that may be at least the first frequency in the second distance detection mode, and the source signals are generated to have a third frequency that is lower than the first frequency in the energy conservation mode.

In at least one embodiment, the at least one processing unit may be configured to determine a distance of the at least one detected potential object from the electronic device based on the current operating mode of the electronic device and the response signals; and the feedback control signal may further be modified based on the distance of the at least one detected potential object from the electronic device.

In at least one embodiment, the feedback control signal may be modified to provide the feedback with increased intensity as the distance of the at least one detected potential object from the electronic device decreases.

In at least one embodiment, the at least one processing unit may be configured to change the current operating mode to the energy conservation mode when the distance of the at least one detected potential object from the electronic device is greater than a sleep distance threshold and the current operating mode is one of the first distance detection mode and the second distance detection mode.

In at least one embodiment, the at least one processing unit may be configured to change the current operating mode to one of the first distance detection mode and the second distance detection mode when the distance of the at least one detected potential object from the electronic device is less than a wake distance threshold and the current operating mode is the energy conservation mode.

In at least one embodiment, the at least one processing unit may be configured to: change the current operating mode to the energy conservation mode when the distance of the at least one detected potential object from the electronic device is greater than a sleep distance threshold and the current operating mode is one of the first distance detection mode and the second distance detection mode; and change the current operating mode to one of the first distance detection mode and the second distance detection mode when the distance of the at least one detected potential object from the electronic device is less than a wake distance threshold and the current operating mode is the energy conservation mode.

In at least one embodiment, the at least one processing unit may be further configured to determine a change in distance of the at least one detected potential object from the electronic device; and change the current operating mode to one of the first distance detection mode and the second distance detection mode when the change in distance of the at least one detected potential object from the electronic device is greater than a change threshold and the current operating mode is the energy conservation mode.

In at least one embodiment, the changing the current operating mode to one of the first distance detection mode and the second distance detection mode may comprise changing the current operating mode to a previous operating mode, the previous operating mode being the operating mode that the electronic device operated in prior to operating in the energy conservation mode.

In at least one embodiment, each operating mode may have at least one of a detection threshold, a source signal frequency, a minimum intensity level, and a maximum intensity level configurable by at least one of a wireless mechanism and a wired mechanism.

In at least one embodiment, the feedback control signal may be further modified based on the at least one of a detection threshold, a minimum intensity level, and a maximum intensity level of the current operating mode.

In at least one embodiment, the transducer may comprise at least one of a vibrator motor, at least one of a low current electric pulse generator, or at least one of a heater resistor.

In at least one embodiment, the transducer comprises the at least one vibrator motor and the feedback control signal may be generated to operate the at least one vibrator motor with at least one of an increasing rotational speed and increasing pulse durations when the feedback is provided with an increasing intensity.

In at least one embodiment, the transducer comprises the at least one low current electric pulse generator and the feedback control signal may be generated to operate the at least one low current electric pulse generator with at least one of an increasing current amplitudes and increasing pulse durations when the feedback is provided with an increasing intensity.

In at least one embodiment, the at least one processing unit may be configured to monitor an electrical energy storage status and to generate at least one of the feedback control signal and at least one device status signal when the monitored electrical energy storage status is lower than the at least one device status signal, each device status signal having a property value indicating an electrical energy storage warning threshold.

In at least one embodiment, the at least one processing unit may further be configured to perform error detection on at least one of the transceiver and the transducer to ensure proper operation and to generate at least one of the feedback control signal and a device status signal with a second property value indicating an operational error when an error is detected on at least one of the transceiver and the transducer.

In at least one embodiment, the electronic device may further comprise a light source configured to provide visual indication to the user when a monitored electrical energy storage status is lower than at least one electrical energy storage warning threshold or an error is detected on at least one of the transceiver and the transducer.

In at least one embodiment, the electronic device may further comprise a speaker for providing audible feedback when there is at least one detected potential object in the vicinity of the user.

In at least one embodiment, the electronic device may further comprise a near field communications module to allow the electronic device to communicate with a mobile electronic device or a headset.

In at least one embodiment, the electronic device may further comprise a camera, wherein an image captured by the camera of the vicinity of the user is transmitted to the mobile electronic device by the near field communications module, and the image captured by the camera is further transmitted to a remote guide by the mobile electronic device to enable the remote guide to provide guidance to the user of the electronic device on the mobile electronic device or the headset.

In at least one embodiment, the electronic device may further comprise a global positioning system (GPS) module, wherein the GPS module communicates with GPS satellites to determine the location of the electronic device; the location of the electronic device is transmitted to the mobile electronic device by the near field communications module, and the location of the electronic device is further transmitted to a remote guide by the mobile electronic device to enable the remote guide to provide guidance to the user of the electronic device on the mobile electronic device or the headset.

In another broad aspect, at least one embodiment described herein provides an electronic device for detecting potential objects in the vicinity of a user of the electronic device. The electronic device may comprise means for releasably clamping the electronic device to an article of the user during use; means for transmitting source signals in the vicinity of the user; means for receiving response signals potentially indicating an object in the vicinity of the user; means for determining if a potential object is detected in the vicinity of the user; means for generating a feedback control signal when the potential object is detected in the vicinity of the user; and means for providing feedback to the user of the electronic device when the feedback control signal indicates detection of the potential object in the vicinity of the user.

In another broad aspect, at least one embodiment described herein provides an electronic device for navigating potential objects in the vicinity of a user of the electronic device. The electronic device may comprise a housing having a clamp that is configured to releasably clamp to an article of the user during use; a transceiver, disposed along the housing and being configured to detect at least one potential object in the vicinity of the user; a control unit configured to receive signals from the transceiver and indicate detection of the at least one potential object in the vicinity of the user; and a transducer movably coupled to the housing and configured to provide feedback to the user of the electronic device when the at least one potential object is detected in the vicinity of the user.

In another broad aspect, at least one embodiment described herein provides a method for providing feedback when at least one potential object in a vicinity of a user is detected. The method may comprise providing an electronic device that releasably clamps to an article of the user during use; transmitting source signals in the vicinity of the user; receiving response signals potentially indicating at least one object in the vicinity of the user; determining if at least one potential object is detected in the vicinity of the user; generating a feedback control signal when the at least one potential object is detected in the vicinity of the user; and providing feedback to the user of the device when the feedback control signal indicates detection of at least one potential object in the vicinity of the user.

In another broad aspect, at least one embodiment described herein provides an electronic device for detecting potential objects in the vicinity of a user of the electronic device. The electronic device may comprise a transceiver configured to transmit source signals in the vicinity of the user and to receive response signals potentially indicating at least one object in the vicinity of the user; at least one processing unit for generating a feedback control signal indicating when there is at least one detected potential object based on the response signals; a transducer configured to provide feedback to the user when the feedback control signal indicates that there is at least one detected potential object in the vicinity of the user; and a clipping structure to releasably attach the electronic device to an article of the user during use.

In at least some embodiments, the transducer may be movably coupled and biased to move towards the user during use.

In at least some embodiments, the electronic device further comprises a main body that houses the at least one processing unit; a transceiver arm that is pivotally coupled to the main body to provide the clipping structure and provides a housing for the transceiver; and a transducer arm that is movably coupled to the main body and provides a housing for the transducer.

In at least some embodiments, the transceiver arm and the transducer arm are coupled on different surfaces of the main body that generally oppose one another.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described.

FIG. 2B shows the electronic device of FIG. 1 worn by the user on a sleeve of their clothing and an example of a vicinity of the user that the electronic device of FIG. 1 may receive response signals from.

FIGS. 13-1 to 13-4 show flowcharts of example embodiments of methods of operating an electronic device for detecting objects (in accordance with the teachings herein).

FIGS. 23A to 23C are top views of the electronic device of FIG. 14 with the selection mechanism in different positions.

Figure 1:
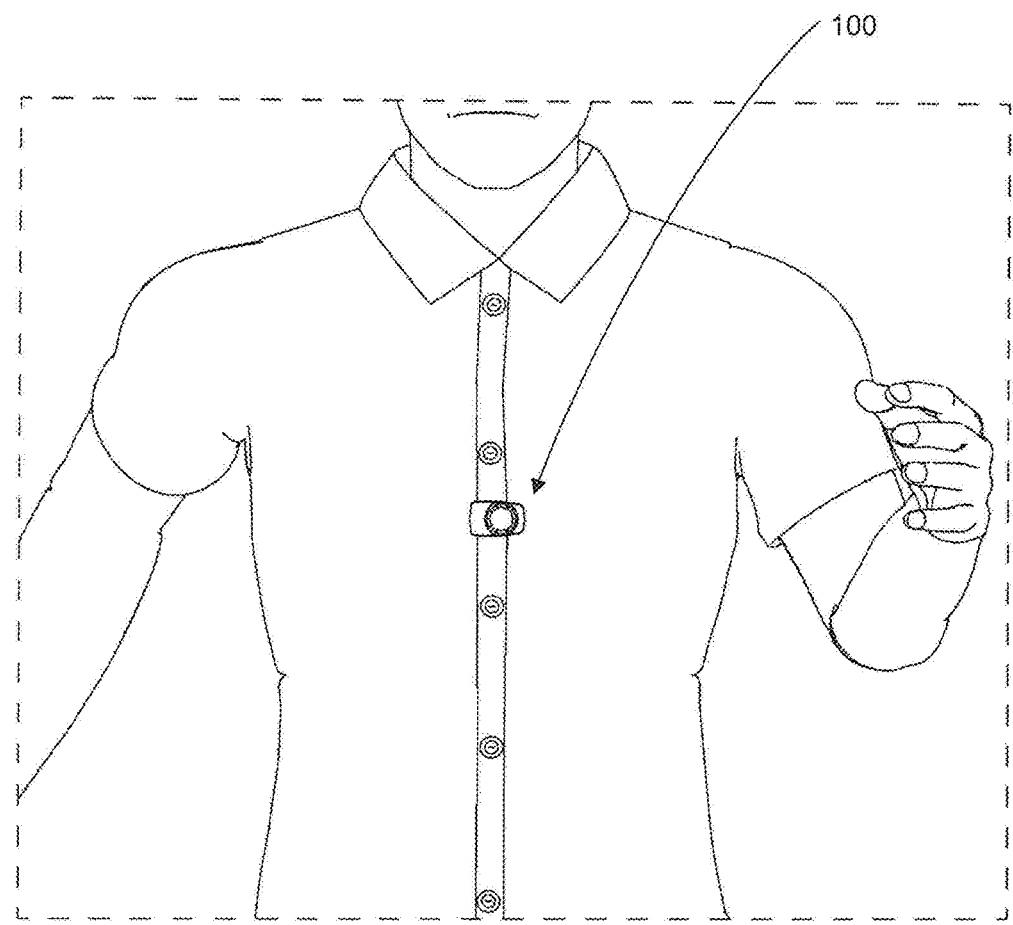
FIG. 1 shows an example embodiment of an electronic device for detecting objects that is worn by a user near the middle of their chest.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various example embodiments described herein.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

One of the most challenging issues of mobility for the blind and the visually impaired is detecting object at the head level. The standard cane or guide dog does not address these objects. In fact, there is a widespread issue of visually impaired individuals frequently bumping their heads on objects such as branches, walls, open cabinet doors, and the like. In addition, the standard cane or guide dog can attract attention that makes an individual feel socially isolated. In accordance with the teachings herein, a device that is discreet can maintain the user's sense of independence and dignity. Accordingly, there is a gap between the needs of the severely visually impaired community and the aids available.

Figure 2A:
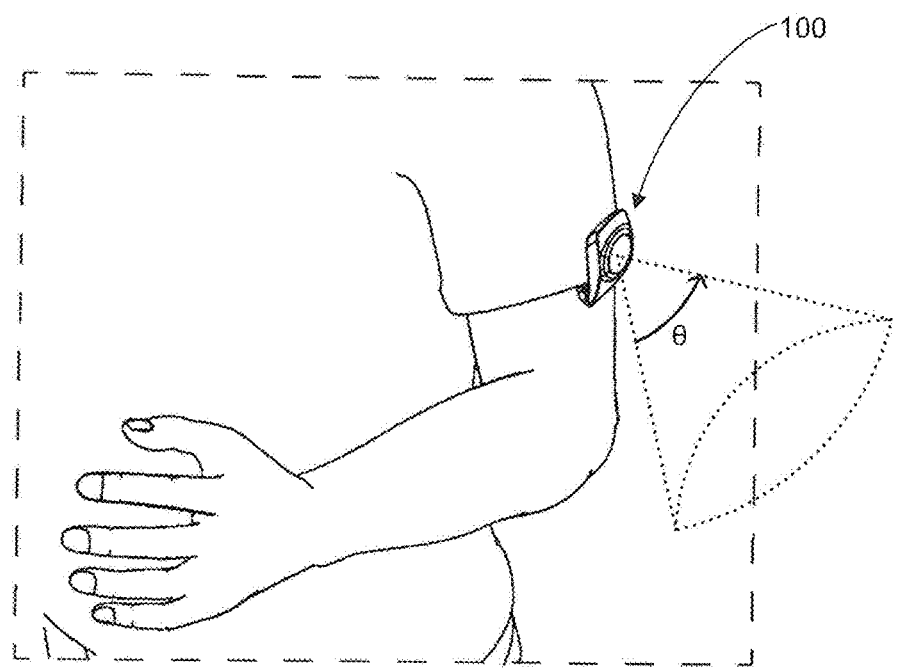
FIG. 2A shows the electronic device of FIG. 1 worn by the user on a sleeve of their clothing and an example of a vicinity of the user that the electronic device of FIG. 1 may transmit source signals towards.
Figure 2B:
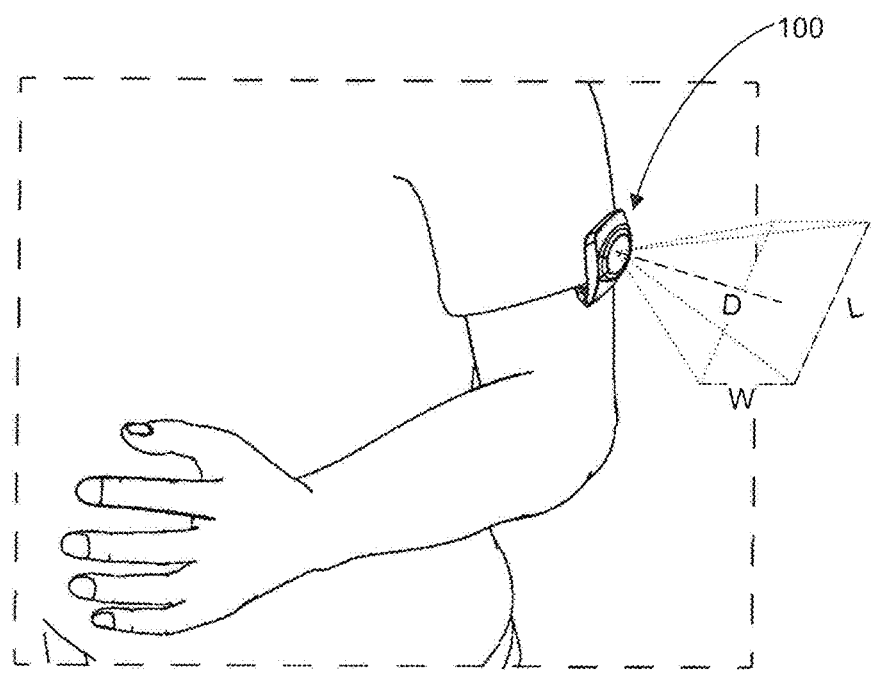

FIGS. 1, 2A, and 2B illustrate at least one embodiment of an electronic device 100 for detecting objects in the vicinity of a user. For example, the vicinity of the user may be defined by a spherical cone shape in which the electronic device transmits source signals to, an example of which is shown in FIG. 2A (not drawn to scale). The spherical cone may be defined by an angle θ between two sphere radii. In at least one embodiment, the angle θ may be 30 degrees. The angle θ may vary, depending on an operating mode of the electronic device such as a near distance detection mode and a far distance detection mode in which the sensitivity of the detector is adjusted to detect potential objects in the user's vicinity that are near to the user, such as under 1 meter for example and far to the user, such as about 3 meter for example. These distances may be selected based on the walking speed of the user since it is expected that the user may walk at a faster speed in an outdoor environment, the detection range is increased in the far distance detection mode as compared to the smaller detection range that is expected to be used when the user is indoors.

The vicinity of the user may also be defined by a detection window from which the electronic device 100 receives response signals from, an example of which is shown in FIG. 2B. Although the detection window shown in FIG. 2B is a rectangle having a length L and width W, the detection window may be configured to be any other shape, including but not limited to a circle or a square, for example. The shape and distance of the detection window may also vary depending on the operating mode of the electronic device 100, such as ranging from 1 meter to 3 meter, for example, for the near distance detection mode and the far distance detection mode, respectively.

As shown in FIG. 1, the electronic device 100 may be worn on the front opening of a user's shirt to detect objects in front of the user. As shown in FIG. 2, the electronic device 100 may also be worn on the sleeve of a user.

A user who is severely visually impaired or blind may use the electronic device to detect objects in the vicinity of the user (e.g. in the front or sides of the user) as the user is walking, standing still or sitting. Alternatively, a user having a peripheral blind spot, possibly due to a stroke, may use the electronic device 100 to detect objects in a particular region where the user has the blind spot or weakened vision.

The electronic device 100 may detect various types of objects outdoors such as, but not limited to, trees, overhanging branches, bushes, plant pots, walls, pillars, sign boards, construction equipment, parked vehicles, trailers, doors, fences, gates, cliff faces, rocks, and boulders, for example. In addition, the electronic device 100 may also detect objects indoors such as open overhead cabinet doors and furniture (e.g. desks, chairs, couches, cabinets). The electronic device 100 may also detect moving objects such as pedestrians, animals, and objects (e.g. sports equipment). It is recognized that the ability of the electronic device 100 to detect objects may be limited if the objects come within the vicinity of the user for only a short duration, if the objects are small (e.g. insects) or have a thin profile (e.g. the object surface is orthogonal to the electronic device 100) or if the objects have material properties that prevent detection.

Although FIGS. 1 and 2 show that the electronic device 100 may be worn on a shirt, the electronic device 100 may also be attached to any article of the user including, but not limited to, tops, blouses, neck ties, pants, belts, suspenders, hats, scarves, gloves, backpacks, purses, and bags, for example. In colder conditions, the electronic device 100 may be worn on the user's jacket or coat. The electronic device 100 may be attached at any location of any article of the user including, but not limited to, lapels, collars, front openings, pockets, sleeves, waistlines, and straps, for example.

Furthermore, using any band, strap or like means, the electronic device 100 may be easily adapted to attach to any location to which it may not readily be attachable. For example, a user having a peripheral blind spot may not have a sleeve to attach the electronic device 100 to. Instead, the user may wear an arm band so that the user can attach the electronic device 100 to the arm band. In another example, a user with a cane or a walking stick may wear a wrist band on the hand holding the cane or walking stick. Likewise, the user can attach the electronic device 100 to the wrist band.

In addition, the band, strap or like means need not be worn by the user. The electronic device 100 may be clamped to a band, strap or like means that may be directly attached to a cane, a walker, a scooter, a wheelchair, or another mobility device. In this case, the electronic device 100 may be limited to providing audible feedback to the user in cases where the user may not be in direct contact, or otherwise coupled with the electronic device 100 and thus not able to receive the haptic feedback (coupling may include an element that may transmit the haptic feedback such as a tube, for example, that is able to vibrate when the electronic device 100 generates a vibratory signal.

Referring now to FIGS. 3 to 11, shown therein are various views of an example embodiment of an electronic device 100 in various positions for detecting potential objects in the vicinity of a user. The electronic device 100 comprises a number of components. In the example shown, the electronic device 100 generally comprises a main body 110, a transceiver arm 120 pivotally connected to the main body 110, and a transducer 155 movably coupled to the main body 110.

Figure 3:
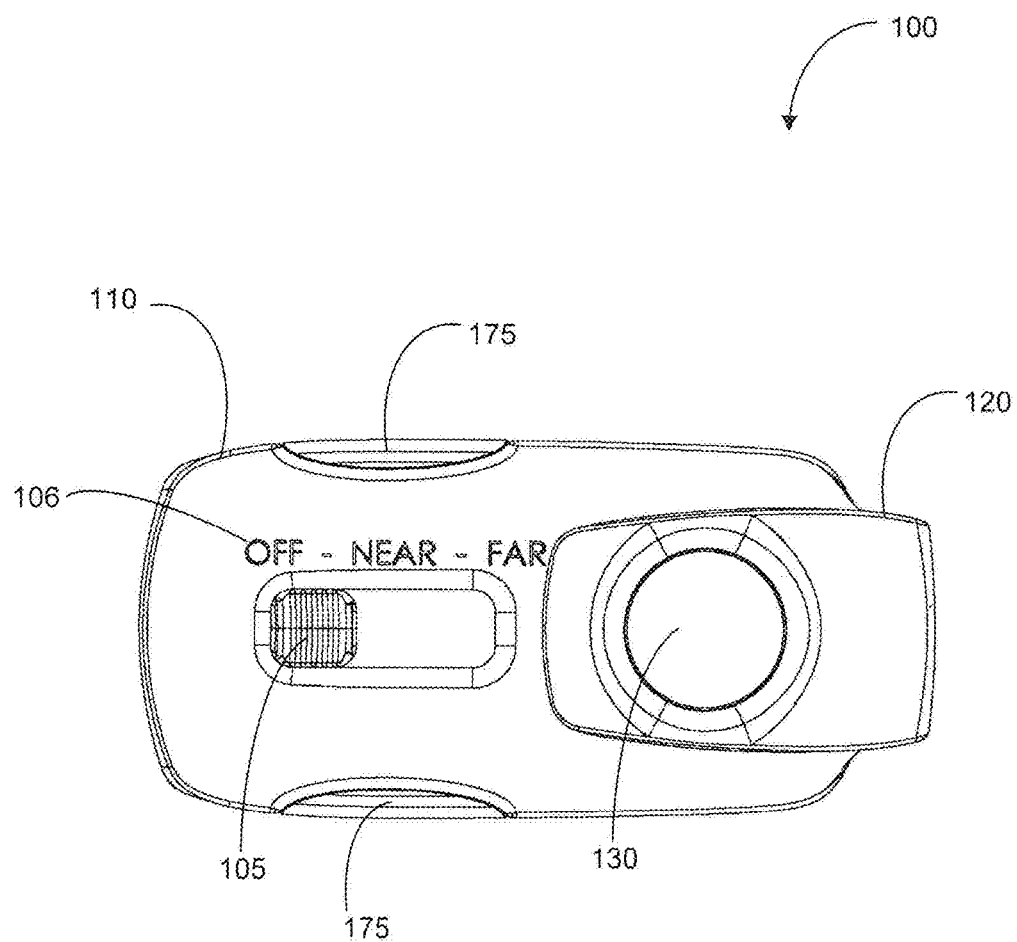
FIG. 3 is a top view of another example embodiment of an electronic device for detecting objects.

FIG. 3 shows a top view of the example electronic device 100. The top view shows the main body 110, the transceiver arm 120, a selection mechanism 105 and selection mechanism indicator 106 disposed along the main body 110, a transceiver 130 disposed along the transceiver arm 120, and contact points 175 disposed along the main body 110.

The main body 110 has a rigid structure to protect components that may be housed inside it. The main body 110 may house a processing unit 195, which controls the overall operation of the electronic device 100. The processing unit 195 may be one or more processors that have enough computing power to provide the various functions of the electronic device 100.

The main body 110 is physically coupled to other components of the electronic device 110. For example, the transceiver arm 120 may be pivotally connected to the main body 110. The transceiver arm 120 and a portion of a main body front element 110a (see FIG. 10) may be used to clamp the electronic device 100 to an article of the user. In other words, the transceiver arm 120 may be a part of a clipping or clamping structure that allows one to clip or clamp the electronic device to an article of the user.

The transducer 155 may be movably connected to the main body 110. The transducer 155 may receive a feedback control signal from the processing unit 195 and provide feedback to the user when the feedback control signal indicates that there is at least one detected potential object in the vicinity of the user. The feedback may be haptic feedback, audible feedback, temperature feedback, or electric current feedback. Examples of haptic feedback include vibration which can mimic tapping, pushing, or pulling sensations. A tapping sensation can be created by discontinuous vibrations. Pushing and pulling sensations may be created by unique vibration frequency patterns.

The selection mechanism 105 and selection mechanism indicator 106 may be disposed on the main body 110. The selection mechanism 105 may be a switch, button, knob, dial, touch-sensitive surface, or any other means of user input control. The selection mechanism indicator 106 may be provided to identify the state of the selection mechanism 105. The selection mechanism indicator 106 may be a tactile surface that is perceptible by visually impaired users. The selection mechanism 105 enables the user to control the electronic device 100 such as powering the electronic device 100 on or off or selecting different operating modes. Powering the electronic device 100 on or off provides a power saving measure and a means to reset the electronic device 100. Although selection mechanism 105 and selection mechanism indicator 106 are shown disposed along the main body 110, in other embodiments, the selection mechanism 105, the selection mechanism indicator 106, or both may be disposed along the transceiver arm 120 or voice control may be used.

In this example embodiment, a single selection mechanism 105 may be provided that both powers the electronic device 100 off and controls the operating mode. In other embodiments, a first selection mechanism 105a may be used to power the electronic device 100 on and off and a second selection mechanism 105b may be used to control the operating mode. In yet another embodiment, a single selection mechanism 105 may be operated in a plurality of ways to control the power and the operating mode. For example, a single button may be pressed once to power the electronic device 100 on; pressed for 3 seconds to power the electronic device 100 off; and pressed twice consecutively to toggle the operating mode.

The processing unit 195 is generally housed within the main body 110. The processing unit 195 controls the overall operation of the electronic device 100. The processing unit 195 may be a microcontroller or any like device that has a processing core, memory, and input and output peripherals. For example, in alternative embodiments, a field programmable gate array, an Application Specific Integrated Circuit or other specialized circuitry may be used to implement the processing unit 195. The processing unit 195 may further comprise an Analog to Digital converter and a Digital to Analog converter. The processing unit 195 may further comprise an internal timer. For simplicity, a single processing unit 195 is described, although the concepts described herein may be performed using one or more processing units.

The processing unit 195 is coupled to the selection mechanism 105 for receiving user input control. The processing unit 195 is also coupled to the transceiver 130, the transducer 155, and an electrical energy storage component 190 (shown in FIGS. 10 and 11). The processing unit 195 operates the electronic device 100 in accordance with the received user input control. Based on the user input control, the processing unit 195 may generate and transmits a pulse input to the transceiver 130, which the transceiver 130 uses to transmit source signals. The processing unit 195 may receive, from the transceiver 130, a representation of the response signals that have been reflected by potential objects in the vicinity of the user. Based on the response signals, the processing unit 195 may generate a feedback control signal, which controls the transducer 155.

The electronic device 100 generally includes the electrical energy storage component 190 (shown in FIGS. 10 and 11) to provide power to circuit components of the electronic device 100. In this example embodiment, the electrical energy storage component 190 is a battery. The battery may be a lithium ion battery. Other suitable energy storage components, such as super-capacitors, may be used in alternative embodiments. The electrical energy storage component 190 may be rechargeable by a wireless or wired mechanism. The electrical energy storage component 190 may have an effective discharge cycle that enables the user to use the electronic device 100 for a certain number of hours without recharging. For example, the electrical energy storage component 190 may have a discharge cycle of 10 hours or 12 hours with power being continuously supplied to the vibrator motor 160. Preferably, the electrical energy storage component 190 would not require recharging with typical use during waking hours (e.g. 18 hour period). The electrical energy storage component 190 may enable fast recharging. For example, the electrical energy storage component 190 may be fully recharged in approximately 1 hour.

The electronic device 100 may have a connection port 165 to couple the electronic device 100 to other devices. The connection port 165 may provide a wired mechanism to recharge the electrical energy storage component 190 from an external power source. In this example embodiment, the connection port may be a micro-USB connector. Other suitable connectors may be used in alternative embodiments.

In at least some embodiments, the processing unit 195 may monitor the status of the electrical energy storage component 190 by measuring the current or the voltage of the electrical energy storage component 190. If the processing unit 195 determines that the charge of the electrical energy storage component 190 is lower than one or more electrical energy storage component warning thresholds, then the processing unit 195 may generate a device status signal to indicate to the user that the status of the electrical energy storage component 190. For example, electrical energy storage component warning thresholds may correspond to 25%, 50%, or 75% charge remaining, or any other suitable level. When a plurality of electrical energy storage component warning thresholds is used, the status signal may uniquely identify the electrical energy storage component warning threshold. For example, a status signal having a single pulse may correspond to a first electrical energy storage component warning threshold (e.g. 25%); a status signal having two consecutive pulses may correspond to a second electrical energy storage component warning threshold (e.g. 50%); and a status signal having three consecutive pulses may correspond to a third electrical energy storage component warning threshold (e.g. 75%). Alternatively, other number of pulses may be associated with the energy storage warning thresholds.

In at least some embodiment, the processing unit 195 may perform error detection to ensure that the transceiver 130 and the transducer 155 are operating properly. If the processing unit 195 determines that either component is not operating properly, the processing unit 195 may take corrective action such as resetting the component. If the processing unit 195 cannot clear the error, the processing unit 195 may generate a device status signal to indicate to the user that a component is not operating properly.

For example, in at least some embodiments, the processing unit 195 may modify the feedback control signal based on the device status signal so that the transducer 155 indicates the device status to the user. Alternatively, the electronic device 100 may include another means to indicate the device status to the user. For example, the electronic device 100 may include a light source (not shown), such as a light emitting diode (LED) for example, that receives the device status signal and provides visual indication of the device status. Although some users of the electronic device 100 are blind and unable to observe visual indications such as an LED light, other users who lack peripheral vision but have partial vision may be able to observe such visual indications.

The transceiver arm 120 may be pivotally coupled to the main body 110. When the electronic device 100 is used, the electronic device 100 may be clamped to an article of the user with the transceiver arm 120 disposed on the exterior of the article of the user, as shown in FIGS. 1 and 2. In at least some embodiments, the transceiver arm 120 may have a shorter length than the main body 110 so that when the electronic device 100 is clamped to an article of the user with the transceiver arm 120 being on the outside of the article, the transceiver arm 120 is discreet, which means that it is less visually noticeable.

The transceiver 130 may be disposed along the transceiver arm 120 in such a fashion as to be able to transmit source signals in the vicinity of the user. Objects in the vicinity of the user may reflect the source signals back to the transceiver 130. The response signals (i.e. reflected source signals) received by the transceiver 130 may indicate a potential object in the vicinity of the user.

As described above, the vicinity of the user may be defined by a spherical cone shape in which the electronic device 100 transmits source signals towards or a detection window from which the electronic device 100 receives response signals from. For example, the source signal may be transmitted at a 60 degree angle horizontally as well as vertically in the near distance detection mode, and 25 degrees in the far distance detection mode. The angle of detection of the transceiver 130 may be changed according to the selected operating mode of the electronic device 100. The angle of detection of the transceiver 130 may be determined based on a detection window that is 1 meter by 1 meter both at the 1 meter range for the near distance detection mode and at the 3 meter range for the far distance detection mode with an additional 5 degrees to allow for minor errors since there may be minor directional shifts based on how the electronic device 100 is attached to an article worn by the user. Since the most common locations that the electronic device 100 may be attached to are collars and sleeves, a 1 meter by 1 meter detection field may effectively cover the user vertically from waist level to the top of their head and horizontally across their entire body width, with additional margin in all directions. Accordingly, the electronic device 100 may be used to detect objects that may be at the head level of the user. Although the electronic device 100 may be used in conjunction with other navigation aids such as canes and guide dogs that can detect objects below waist level, the user may also use additional electronic devices 100 to detect objects below waist level. For instance, the electronic device may be attached at the waistline to a belt, belt loop, pant pocket, or low-hanging lanyard.

When a legally blind individual is using a cane or guide dog, the electronic device 100 may enhance their ability to maneuver their surroundings as the electronic device 100 will provide information about their surroundings at a higher level, i.e. from the user's waist to their head whereas a cane or guide dog can provide information about their surroundings from the waist down. For individuals who do not use a cane or a guide dog, the electronic device may be worn at waist level, such as an a belt for example, so that the user can receive information about their surroundings from mid-torso to below the waist and possibly lower. In this case, and when the electronic device 100 is worn at a higher location, it may be possible to change the angle at which source signals are transmitted and response signals are received in order to increase the detection range.

When the electronic device 100 includes a single transceiver 130, the angle θ (see FIG. 2A) may be adjusted by software or hardware such as a mechanical shutter. When the electronic device 100 includes a plurality of transceivers, the angle may be further adjusted by adjusting the detection angle of each of the different transceivers and these detection angles may be different. In this case, the operation mode may result in activating a different number of transceivers. For example, if the electronic device includes a five transceiver arrangement with one transceiver at the centre and each additional transceiver located directly to the left, right, top, and bottom of the centre transceiver, in the near distance detection mode, all transceivers may be activated. If each transceiver has a detection angle of 20 degrees, the combined detection angle of the electronic device in the near distance detection mode may be 60 degrees in the vertical and horizontal planes. The far distance detection mode may only activate the centre transceiver and the combined detection angle of the electronic device may be 20 degrees. It is recognized that the desirability of using multiple transceivers may be limited by cost considerations.

The transceiver 130 may be any transceiver capable of transmitting and receiving signals to perform such ranging. For example, the transceiver 130 may be a piezoelectric ultrasonic sensor that performs ranging using sound frequencies that are inaudible to humans (e.g. frequencies higher than 20 kHz). When ultrasound signals are used, the electronic device 100 may detect objects irrespective of light conditions. In another embodiment, the transceiver 130 may be an infrared sensor that performs ranging using infrared light waves (e.g. wavelength between 700 nm to 1 mm). In another embodiment, the transceiver 130 may be Light Detection And Ranging (LIDAR) technology that performs ranging using laser pulses (e.g. 600-1000 nm lasers). However, when infrared sensors are used, a smooth surface at a critical angle may reflect the infrared wave in a direction away from the electronic device 100 without returning a response signal to the transceiver 130. Furthermore, infrared sensors may not be able to detect transparent surfaces such as clear glass. Additional signal processing techniques may be provided to filter environmental conditions such as light when the transceiver 130 uses infrared or LIDAR technology.

The transceiver 130 is coupled to a processing unit 195. The transceiver 130 may receive a pulse input from the processing unit 195 to transmit the source signals. In at least one embodiment, the pulse input may be multiple, in-phase square waves. The square waves may have equal amplitude. The frequency of the pulse input may be pre-calibrated and selected based on the type of transceiver 130 used. In at least one embodiment, the frequency of the pulse input is in the range of 40 kHz to 42 kHz frequency when a piezoelectric ultrasonic sensor is used. The internal timer of the processing unit 195 may be used to track the time of flight of the source signals.

The transceiver 130 may also transmit the response signals to the processing unit 195 to determine if a potential object is detected in the vicinity of the user. The processing unit 195 may use time of flight or speed of sound based techniques to determine the distance of a potential object.

In at least one embodiment, the processing unit 195 may minimize delays by performing minimal processing of the response signals. For example, the response signals received from the transceiver 130 may be analog signals and the processing unit 195 may use the analog signals directly, without converting the signals from analog to digital. The processing unit 195 may be configured to have a response signal threshold for processing analog signals received from the transceiver 130. The response signal threshold may be an amplitude value. The processing unit 195 may process any response signals received from the transceiver 130 that exceed the response signal threshold to determine if a potential object is detected in the vicinity of the user and the processing unit 196 may not process any response signals that do not exceed the response signal threshold. The response signal threshold may be selected to have a value similar to that when no response signal is received.

Figure 4:
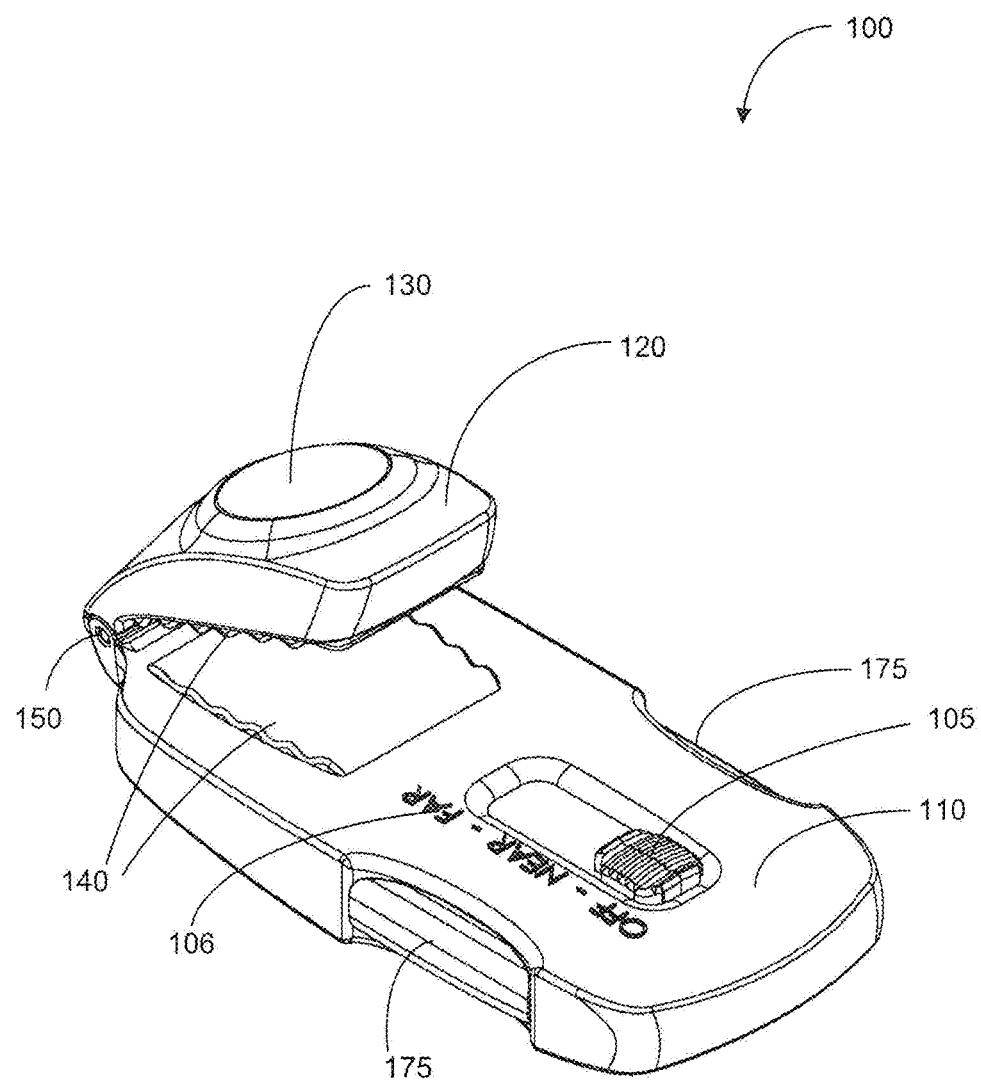
FIG. 4 is a perspective view of the electronic device of FIG. 3 with the transceiver arm in an unlocked position relative to a main body.
Figure 5:
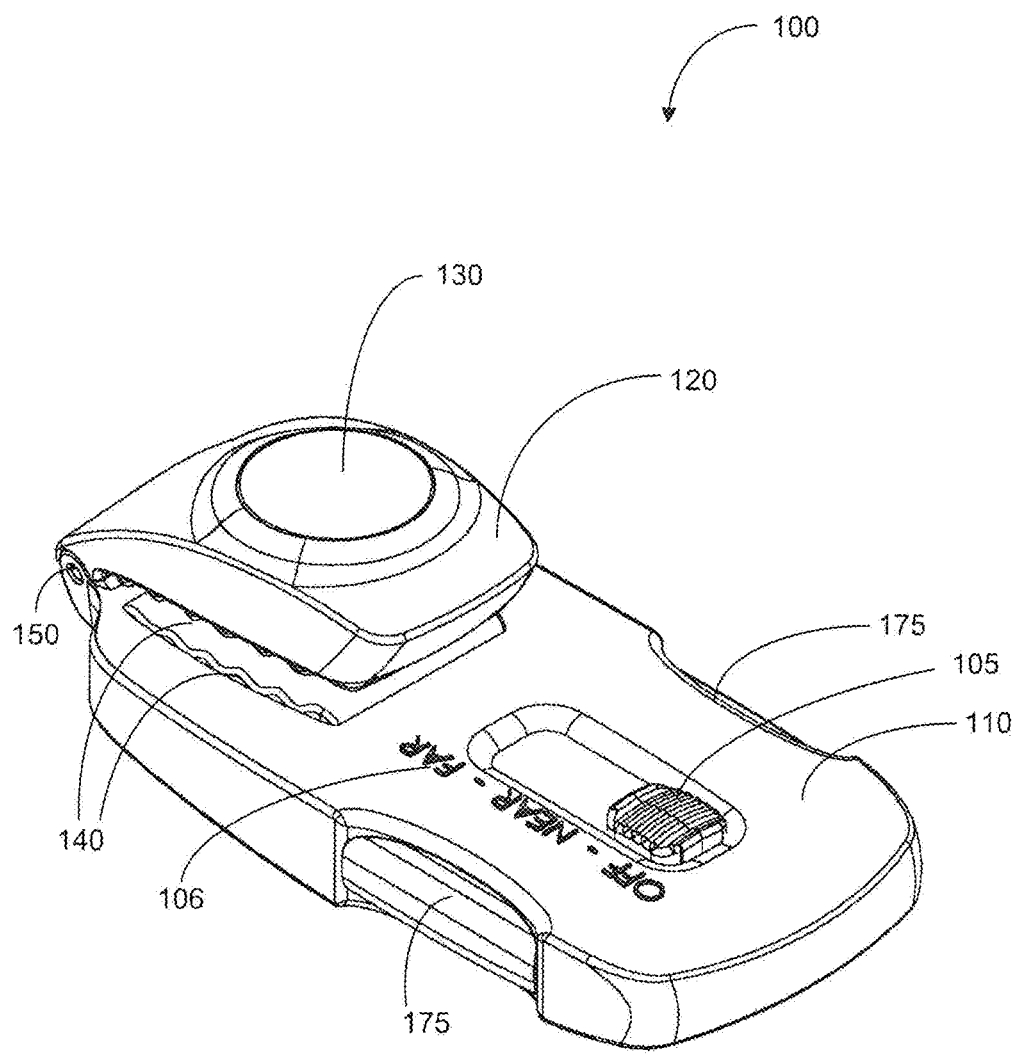
FIG. 5 is a perspective view of the electronic device of FIG. 3 with the transceiver arm in a locked position relative to the main body.

Referring now to FIG. 4, shown therein is a top perspective view of the electronic device 100 with the transceiver arm 120 in an unlocked position relative to the main body 110. Referring now to FIG. 5, shown therein is a top perspective view of the electronic device 100 with the transceiver arm 120 in a locked position relative to the main body 110. Prior to attaching the electronic device 100 to an article of the user, the transceiver arm 120 is moved to the unlocked position and to releasable secure the electronic device 100 to the article of the user, the transceiver arm 120 is moved to the locked position.

As shown, surfaces of the main body 110 and the transceiver arm 120 that face one another may comprise a textured surface pattern 140. The textured surface pattern 140 may be used to provide a better grip on the article of the user when the electronic device 100 is clamped to the article of the user. The textured surface pattern 140 and the locking mechanism may keep the electronic device 100 stable and secure when the electronic device 100 is clamped to an article of the user. Advantageously, this stability and security may reduce the need to frequently re-position the electronic device 100.

The transceiver arm 120 may be pivotally connected to the main body 110 by a spring-loaded hinge 150 that biases the transceiver arm 120 towards the main body 110. The electronic device 100 may include a mechanism to lock the transceiver arm 120 in a certain position relative to the main body 110. In the locked position, the transceiver arm 120 may clamp to an article of the user. In at least one embodiment, the transceiver arm 120 may be released from the locked position by directly manipulating the transceiver arm 120, as described below.

Figure 6:
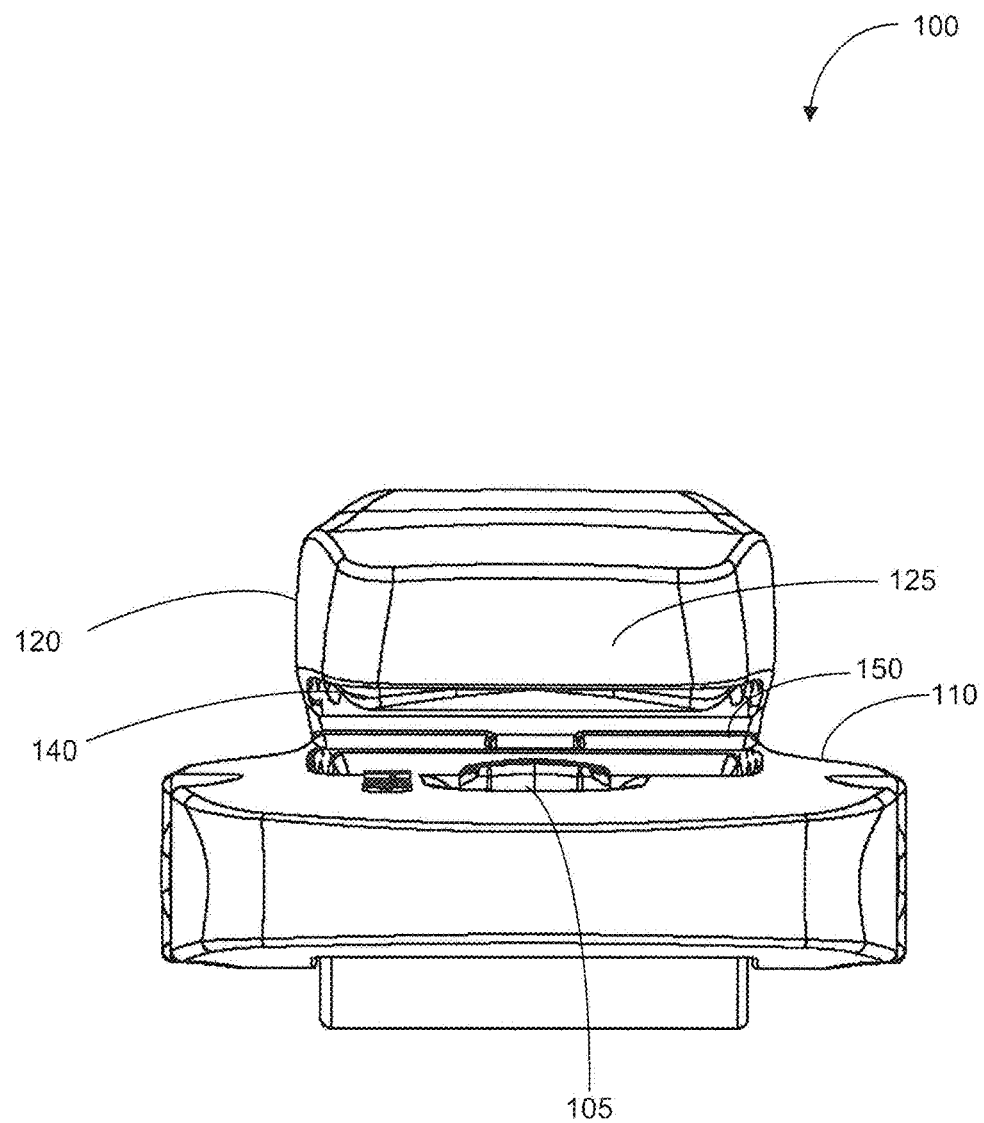
FIG. 6 is a front end view of the electronic device of FIG. 3 with the transceiver arm and transducer arm in a retracted position relative to the main body.
Figure 7:
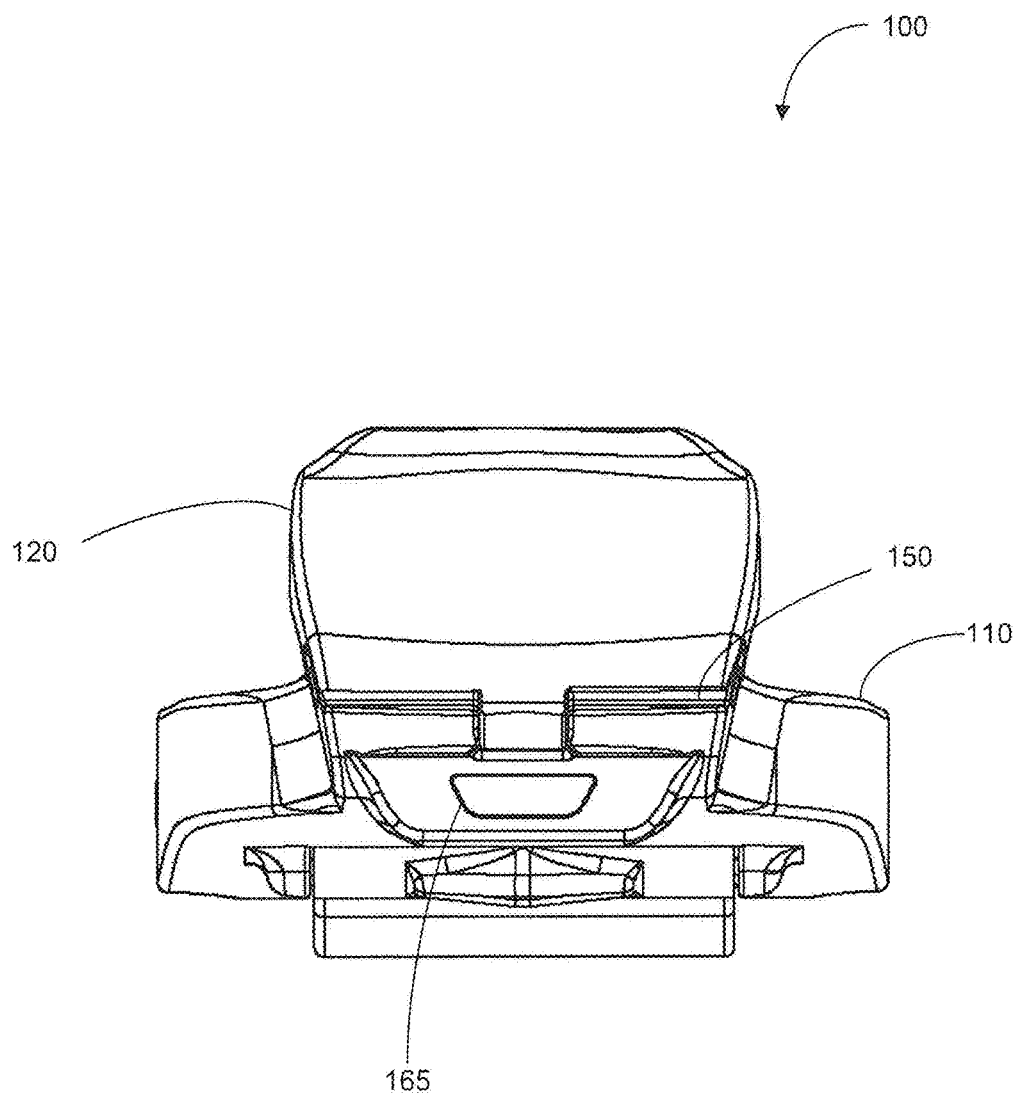
FIG. 7 is a rear end view of the electronic device of FIG. 3 with the transceiver arm and transducer arm in the retracted position relative to the main body.

Referring now to FIGS. 6 and 7, shown therein are end views of the electronic device 100. FIG. 6 shows a front end view of the electronic device 100 in which the interior of the pivotal connection between the main body 110 and the transceiver arm 120 can be seen. In particular, FIG. 6 shows a transceiver arm release point 125 at the end of the transceiver arm 120. FIG. 7 shows an end view of the electronic device 100 in which the exterior of the pivotal connection between the main body 110 and the transceiver arm 120 can be seen. Also shown is the connection port 165 that is disposed on the main body 110 and below the spring-loaded hinge 150. The spring-loaded hinge 150 couples the transceiver arm 120 to the main body 110.

Figure 11:
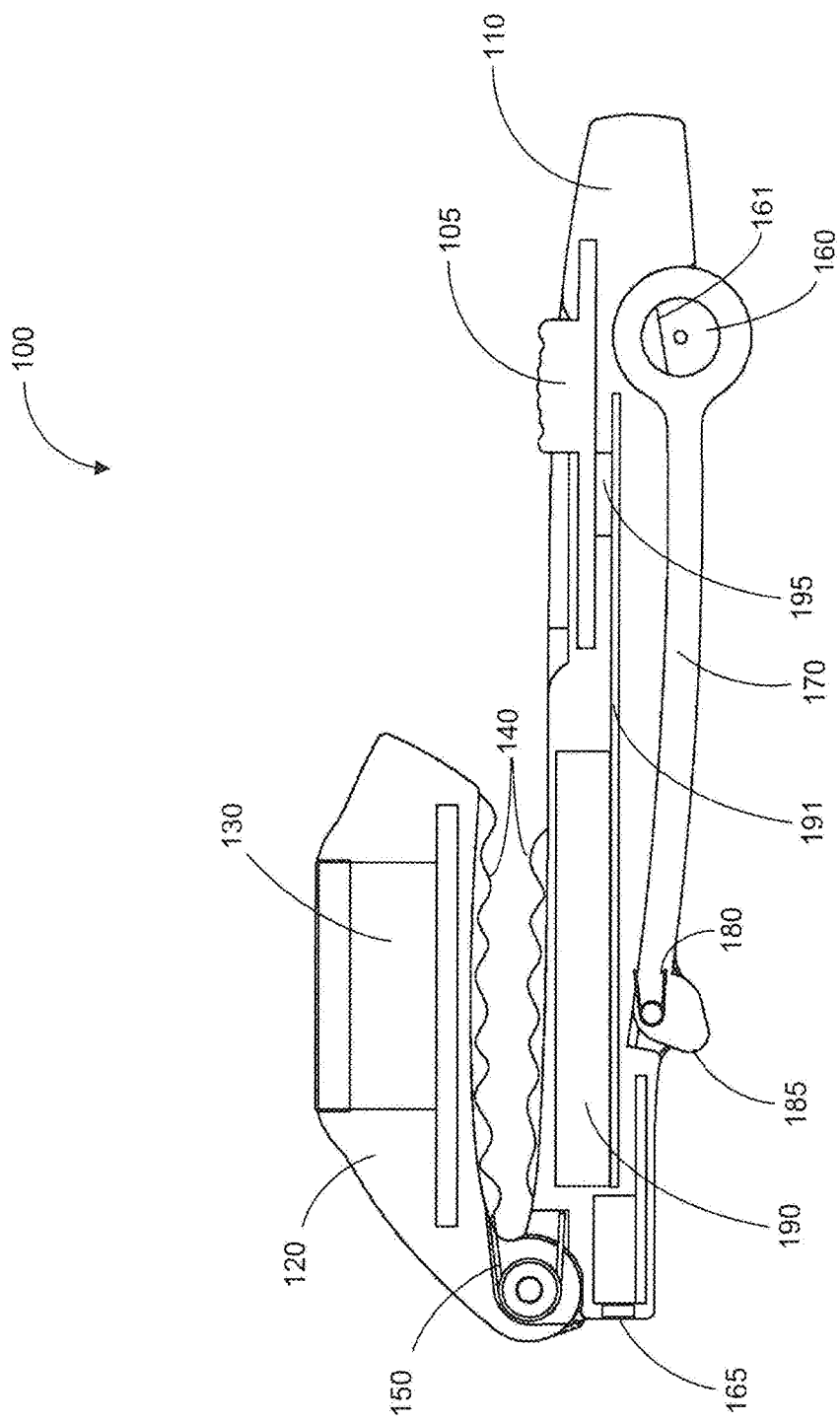
FIG. 11 is a cross-sectional side view of the electronic device of FIG. 3 with the transducer arm in the retracted position relative to the main body.

In this example embodiment, force may be applied to the transceiver arm 120 at the transceiver arm release point 125 in a direction away from the main body 110. Alternatively, force may be applied to the transceiver arm release point 125 in the direction towards the main body 110. The transceiver arm release point 125 is provided so that the user does not have to apply undue pressure near the portion of the transceiver arm 120 on which the transceiver 130 is disposed, thereby reducing the chance of damaging the transceiver 130 when the electronic device 100 is moved between locked and opened positions. The transceiver arm release point 125 may be any means that provides easier manipulation of the transceiver arm 120. For example, the transceiver arm release point 125 may be a sloped edge (as shown in FIGS. 6 and 11), a gripped surface, a ridged edge, or any combination thereof. In other embodiments, the transceiver arm release point 125 may be a button or any other like means.

Figure 8:
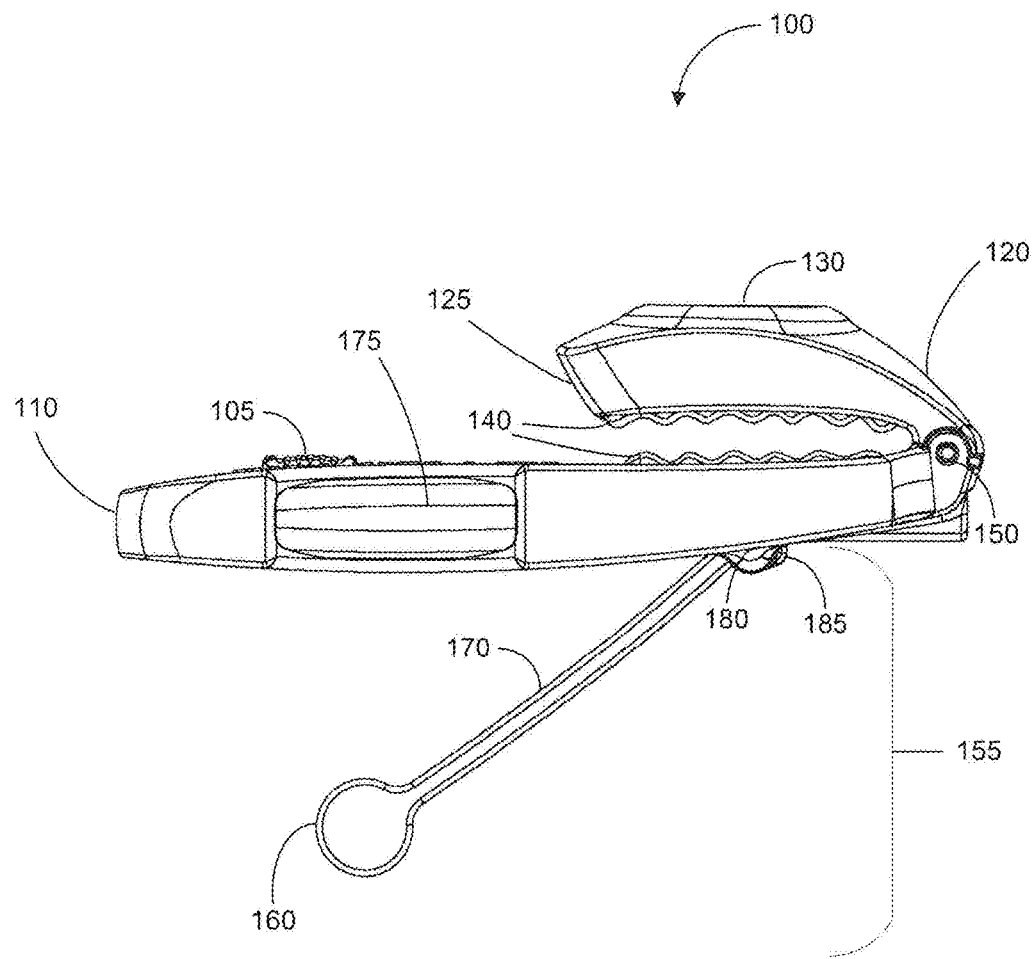
FIG. 8 is a side view of the electronic device of FIG. 3 with the transducer arm in an extended position relative to the main body.
Figure 9:
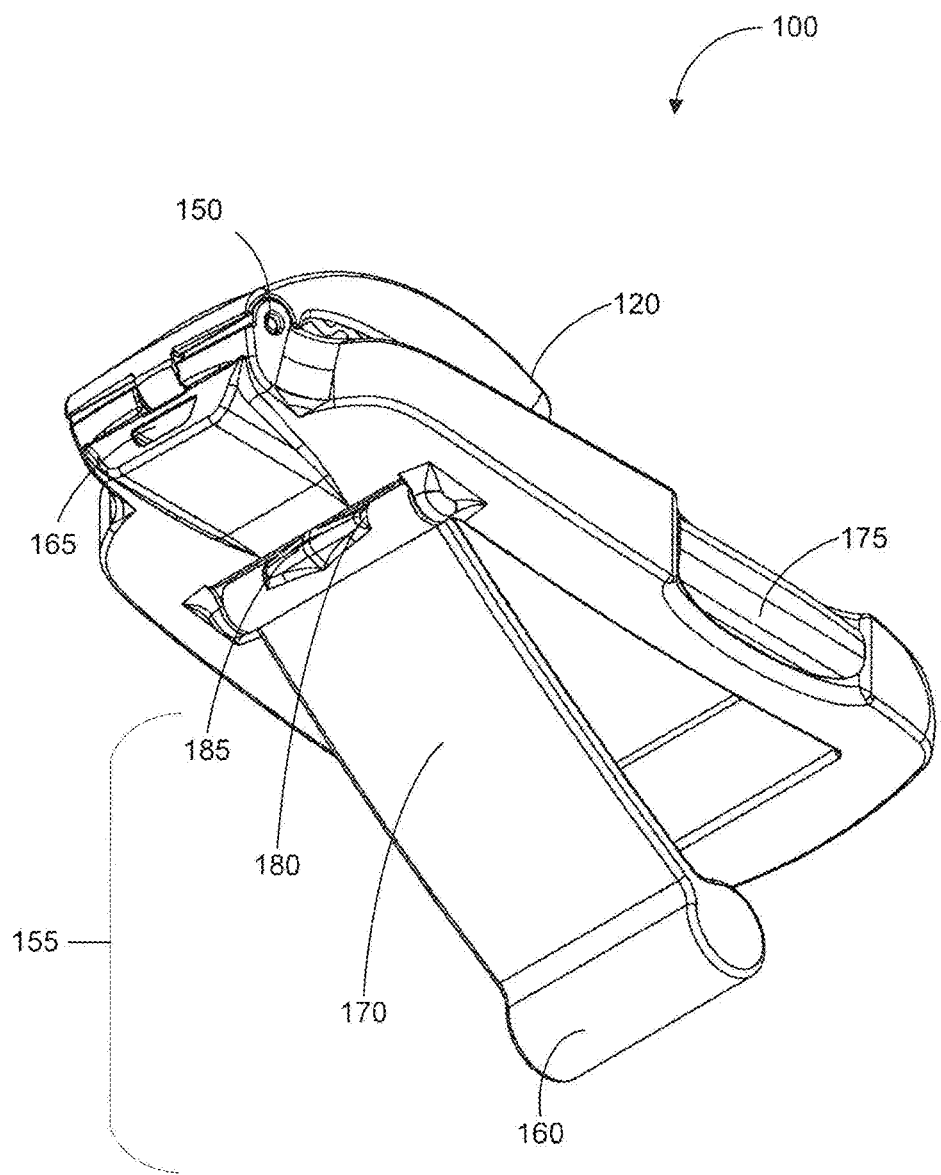
FIG. 9 is a bottom perspective view of the electronic device of FIG. 3 with the transducer arm in the extended position relative to the main body.

Referring now to FIGS. 8 and 9, shown therein is a side view and a bottom perspective view, respectively, of the electronic device 100. FIGS. 8 and 9 show the transducer 155 comprising a transducer arm, a spring 180, a cam 185, contact points 175, and a vibrator motor 160. The cam 185 is disposed in such a manner as to limit the movement of the transducer arm 170 with respect to the main body 110 of the electronic device 100. In this example embodiment, the cam 185 is disposed within the main body 110. The contact points 175 allow the user to control a lock-release mechanism of the transducer arm 170. The vibrator motor 160 is generally disposed at the end of the transducer arm 170.

In this example embodiment, the transducer arm 170 is movably coupled to the main body 110. FIG. 8 shows the transducer arm 170 in an extended position relative to the main body 110. In the extended position, the transducer arm 170 may compensate for different articles of the user that place the main body 110 of the electronic device 100 at different distances from the user's body. When the electronic device 100 is clamped to a looser article, such as loose fitting clothing or shirt-sleeves with larger arm holes, for example, the main body 110 may be further away from the user's body. The distance between the main body 110 and the user's body may be compensated by the transducer arm 170. To help ensure that the transducer 155 is in contact with the user's body or is near enough to the user's body to provide feedback, the transducer arm 170 may be biased away from the main body 110 by the spring 180. However, as the spring 180 may bias the transducer arm 170 away from the main body 110, the range of motion of the transducer arm 170 away from the main body 110 may be limited by the cam 185. The cam 185 prevents the transducer arm 170 from being overextended and damaged. The cam 185 may be a hinge cam or other suitable rotating mechanical linkage.

The transducer arm 170 may also isolate the transceiver 130 from the feedback provided by the transducer 155. This is beneficial as the transceiver 130 may comprise components that are sensitive to environmental conditions such as temperature, humidity, and/or vibrations. The feedback provided by the transducer 155 may affect such conditions. In addition to compensating for the distance between the main body 110 and the user's body, the transducer arm 170 also provides some physical distance between the transducer 155 and the main body 110 which allows for the effects of the feedback to dissipate before reaching the transceiver 130. Thus, the transceiver 130 is isolated from the feedback provided by the transducer 155.

The electronic device 100 may include a lock-release mechanism that can lock the transducer arm 170 in a fully-retracted position relative to the main body 110 and release the transducer arm 170 from the locked position. In an unlocked position, the spring 180 applies a constant force to maintain the transducer arm 170 in a fully-extended position relative to the main body 110. The transducer arm 170 remains at the fully-extended position until a counter force is applied when the body of the user comes into contact with the transducer arm 170. The weight and elasticity of the article which the electronic device 100 is attached to and the weight of the electronic device itself may promote contact between the transducer arm 170 and a body portion of the user. The surface of the transducer arm 170 that is in contact with the user may be exposed to perspiration from the user. Accordingly, the transducer arm 170 may be formed of a material to provide a moisture-proof enclosure that protects the vibrator motor 160 from perspiration, rain, or other environmental conditions.

The lock-release mechanism may include transducer arm release points 175 disposed along the main body 110. The transducer arm release points 175 may be squeezed to trigger the lock-release mechanism. Alternatively, in another embodiment, the transducer arm release points 175 may be a single mechanical unit that is pushed or pulled to trigger the respective lock and release mechanism to lock or release the transducer arm 170. The transducer arm release points 175 may be buttons, or any like means. Alternatively, any number of transducer arm release points 175 may be provided as appropriate.

FIGS. 6 and 7 show the electronic device 100 having a low profile (i.e. a small height or low thickness) when the transceiver arm 120 is in a retracted position relative to the main body 110. The low profile of the electronic device 100 may enable it to be more comfortably clamped to an article of the user. When the electronic device 100 is clamped to an article of the user, the low profile keeps the electronic device 100 discreet. A low profile, as well as a balanced distribution (by weight) of internal components, also provides preferable weight distribution so that when clamped to an article of the user, the electronic device 100 hangs in a neutral position towards the user and is not predisposed to hang away from the user.

In this example embodiment, the transducer arm 170 is coupled to the main body 110 at the same end of the main body 110 that the transceiver arm 120 is coupled with. This orientation may prevent the article of the user from gathering between surfaces of the transducer arm 170 and the main body 110 that face one another when the electronic device 100 is clamped to an article of the user. In alternative embodiments, the transducer 155 may be positioned relative to the main body 110 at a location that provides balanced weight distribution of the electronic device 100 when the electronic device 100 is clamped to an article of the user so that the electronic device 100 hangs in a neutral position towards the user and is not predisposed to hang away from the user. The term "neutral position" is used here to describe the electronic device 100 naturally pressing onto the body of the user with transducer 155 in contact with the body of the user.

The vibrator motor 160 disposed at the end of the transducer arm 170 may provide mechanical vibrations as feedback to the user. The vibrator motor 160 may be any type of motor that causes mechanical vibrations. In this example embodiment, the vibrator motor 160 has an eccentric weight 161 attached to its shaft which causes mechanical vibrations when the vibrator motor 160 rotates. Alternatively, the vibrator motor 160 may have an eccentric rotor or some other physical structure that causes mechanical vibrations when the vibrator motor 160 rotates.

In another embodiment, the transducer 155 may comprise a low current electric pulse generator or a heater resistor. In yet other embodiments, the transducer 155 may comprise a plurality of vibrator motors, low current electric pulse generators, or heater resistors, and a plurality of transducer arms 170. In the case of the low current electric pulse generator, feedback may be provided through varying low current electric shocks based on the distance of detected potential objects. In the case of a heat resistor, feedback may be provided through varying heat generated based on the distance of detected potential objects.

Figure 10:
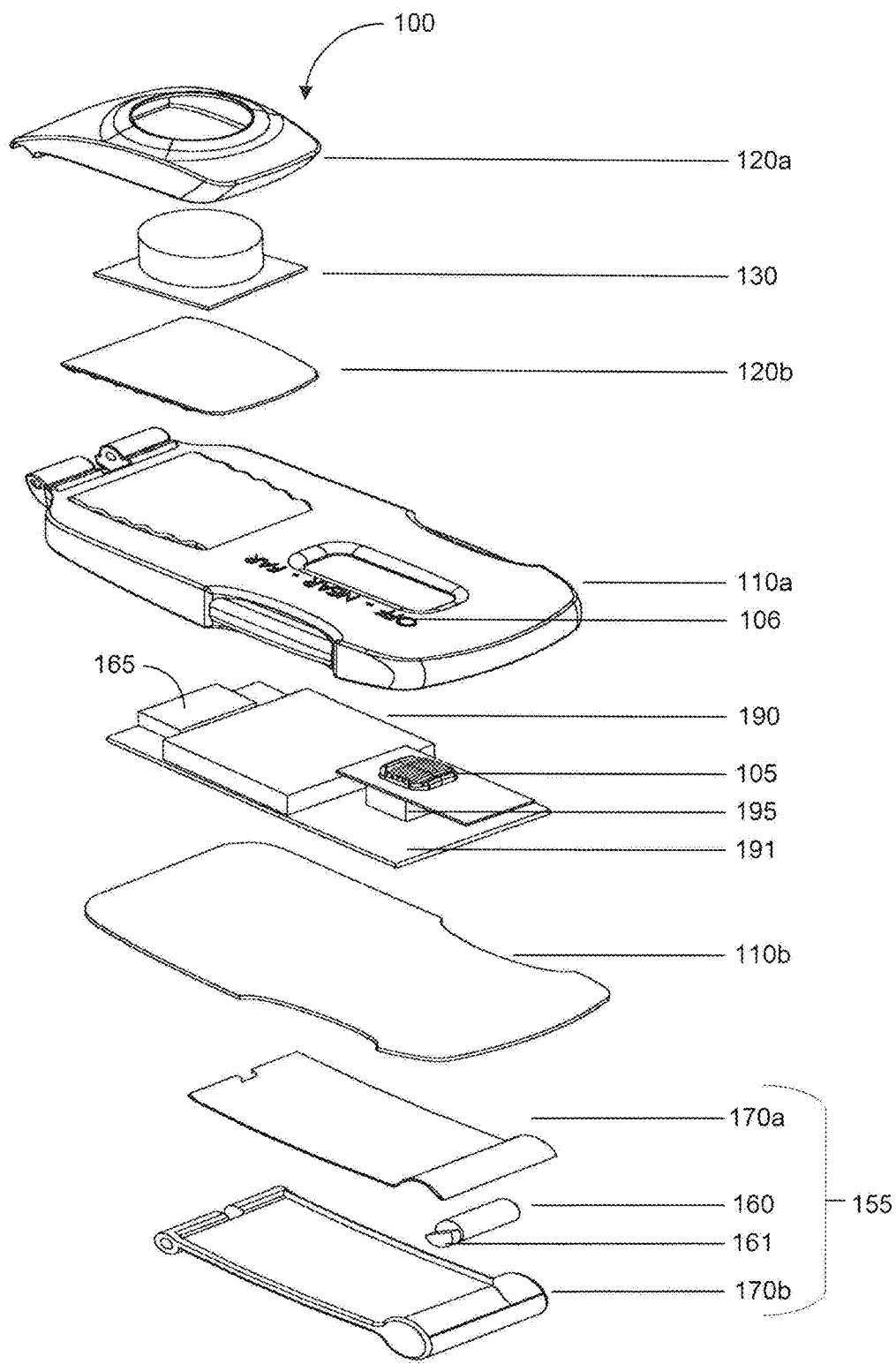
FIG. 10 is an exploded view of the electronic device of FIG. 3.

Referring now to FIG. 10, shown therein is an exploded perspective view of the electronic device 100. In this example embodiment, the transceiver arm 120 may house the transceiver 130 and may be comprised of a transceiver arm front element 120a and a transceiver arm back element 120b. In this example embodiment, the main body 110 may house the micro-USB connection port 165, the electrical energy storage component 190, the selection mechanism 105, and the processing unit 195 on a printed circuit board 191. The main body 110 may be comprised of a main body front element 110a and a main body back element 110b. The transducer arm 170 may also house the vibrator motor 160 and may be comprised of a transducer arm front element 170a and a transducer arm back element 170b. The main body 110 may provide a moisture-proof enclosure that protects the electrical energy storage component 190, the selection mechanism 105, the processing unit 195, and the printed circuit board 191, from rain or other environmental conditions.

Referring now to FIG. 11, shown therein is a cross-sectional view of the electronic device 100 with the transceiver arm 120 and the transducer arm 170 in a retracted position. The relative spacing of the internal components of the electronic device 100 are shown in FIG. 11. It may be possible to position the internal components differently in other embodiments.

Figure 12:
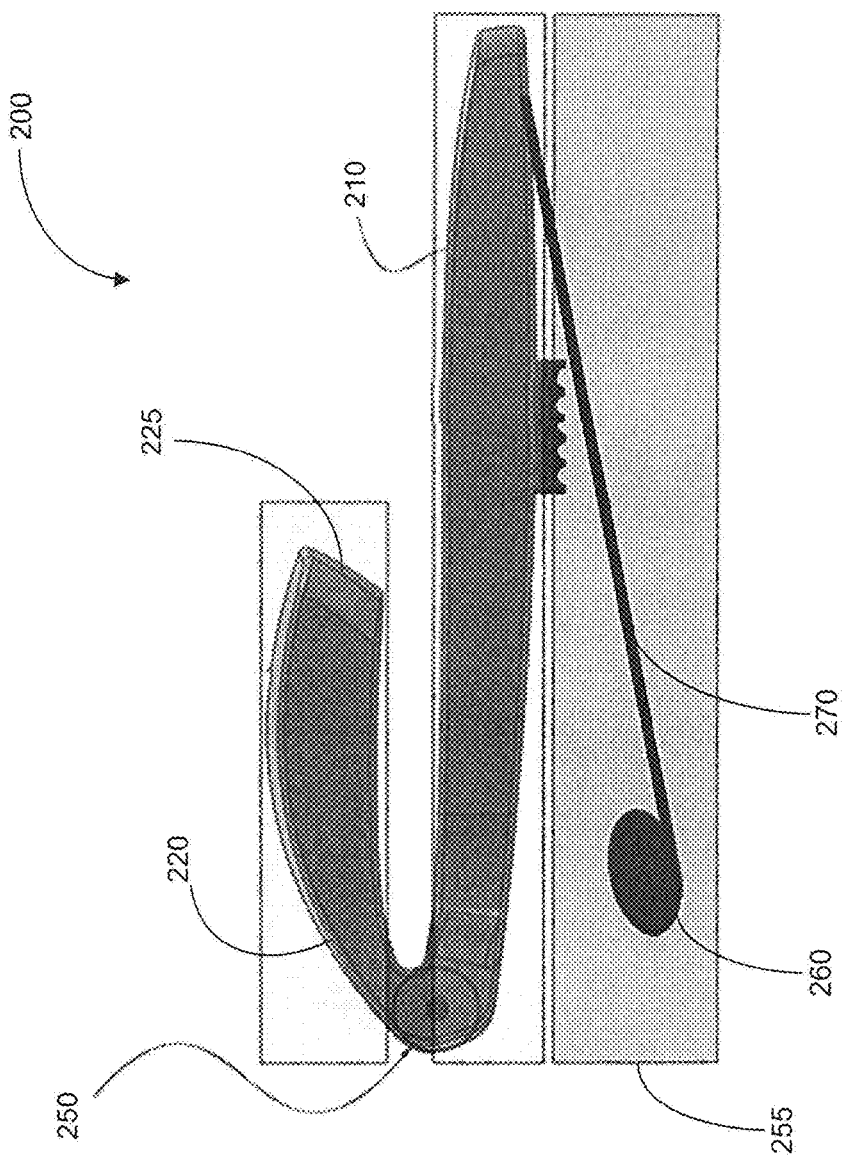
FIG. 12 is a side view of another example embodiment of an electronic device for detecting objects.

Referring now to FIG. 12, shown therein is a side view of another example embodiment of an electronic device 200 which may be used to detect potential objects in the vicinity of a user. The electronic device 200 comprises a main body 210, a transceiver arm 220 including a transceiver (not labelled) and a transceiver release point 225, a pivotal coupler 250, and a transducer portion 255 having a transducer arm 270 along with a transducer 260. In this embodiment, the transducer arm 270 of the electronic device 200 is coupled to the main body 210 at the opposite end of the main body 210 as that to which the transceiver arm 220 is coupled. This orientation may not prevent the article of the user from gathering between inner surfaces of the transducer arm 270 and the main body 210 like other embodiments of the electronic device 100. However, this orientation provides greater isolation of the transceiver 230 from the feedback provided by the transducer 255 because of the added length of the main body 210. In addition, the vibrator motor 260 is located further away from the location at which the electronic device 200 clamps to an article of the user. This reduces the amount of compensation required of the vibrator arm 270 when different articles of the user place the main body 210 of the electronic device 200 at different distances from the user's body.

In an example embodiment, the electronic device 100 may have a length of about 73.47 mm, a width of about 38.05 mm, a depth (e.g. thickness of profile) of about 17.57 mm, and a weight of about 25 grams with the printed circuit board 191 and all circuit components installed. The size in this example offers the advantage of being more discreet than other assistive technologies currently available in the industry, which allows individuals to keep their vision impairment private if so desired. The size in this example also makes the electronic device more easily portable. Furthermore, this example embodiment is lightweight and minimizes the burden of use in the long term. It should be noted that there may be other sizes that are used in other embodiments which are different than this particular example and may vary by several grams and centimeters or tenths of a centimeter depending on the particular dimension.

In at least one alternative embodiment, the electronic device 100 may also include a light source (not shown) for providing visual indication to the user of the status of the electronic device 100. The light source may be coupled to the processing unit 195 to receive a device status signal from the processing unit 195 and provide visual indication of the device status. The light source may be a light emitting diode (LED) or other similar means.

In at least one alternative embodiment, the electronic device 100 may also include a speaker (not shown) for providing audible feedback to the user of the electronic device 100. The speaker may be coupled to the processing unit 195 to receive the feedback control signal from the processing unit 195 and provide audible feedback when a potential object is in the vicinity of the user. Generally, when the electronic device 100 is clamped to a band, a strap or like means that is not worn by the user, the electronic device 100 may provide audible feedback to the user.

In at least one alternative embodiment, the electronic device 100 may include a near field communications module (not shown). The near field communications module may be coupled to the processing unit 195 to allow the electronic device 100 to communicate with a mobile electronic device or a headset. The near field communications module may be Bluetooth technology or other similar means. Near field communications may support additional functionality such as remote guidance (described below) or other cloud-based support services.

In at least one alternative embodiment, the electronic device 100 may include a camera (not shown). The camera may have a lens, disposed along the transceiver arm 120, to capture images of the vicinity of the user. The images captured by the camera may be transmitted to the mobile electronic device by the near field communications module or another suitable communication technology such as an RF transceiver or Bluetooth. The mobile electronic device may operate software that transmits the images captured to a remote location not in the vicinity of the user. A guide may be located at the remote location to analyze the captured images. Having analyzed the image of the vicinity of the user, the remote guide may provide guidance to the user of the electronic device 100. Guidance may relate to but is not limited to information about a potential object or directions for navigation. The user of the electronic device 100 may receive guidance from the remote guide using the mobile electronic device, which may be a smart phone for example.

In at least one alternative embodiment, the electronic device 100 may include a global positioning system (GPS) module. The GPS module may communicate with GPS satellites to determine the location of the electronic device 100. The electronic device 100 may transmit its location to the mobile electronic device using the near field communications module. The mobile electronic device may operate software that transmits the location of the electronic device 100 to a remote guide. The remote guide may analyze the location and provide guidance to the user of the electronic device 100 based on the location of the electronic device (and hence the location of the user when wearing the electronic device).

Figures 1, 13:
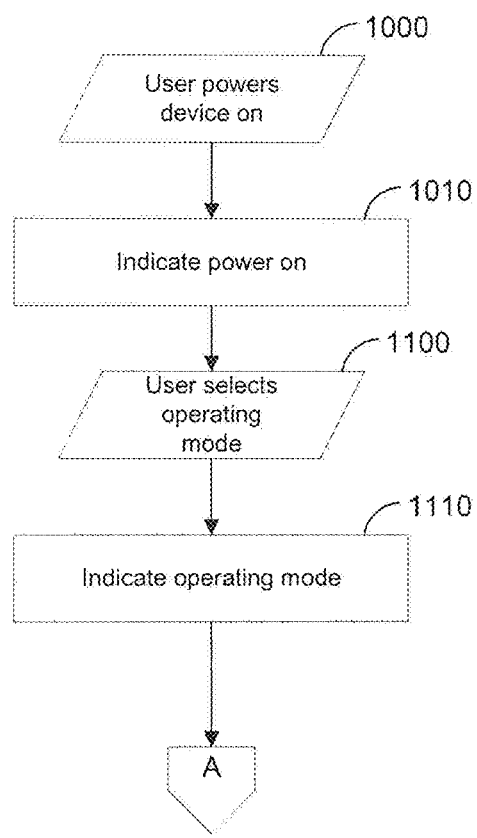
Figures 2, 13:
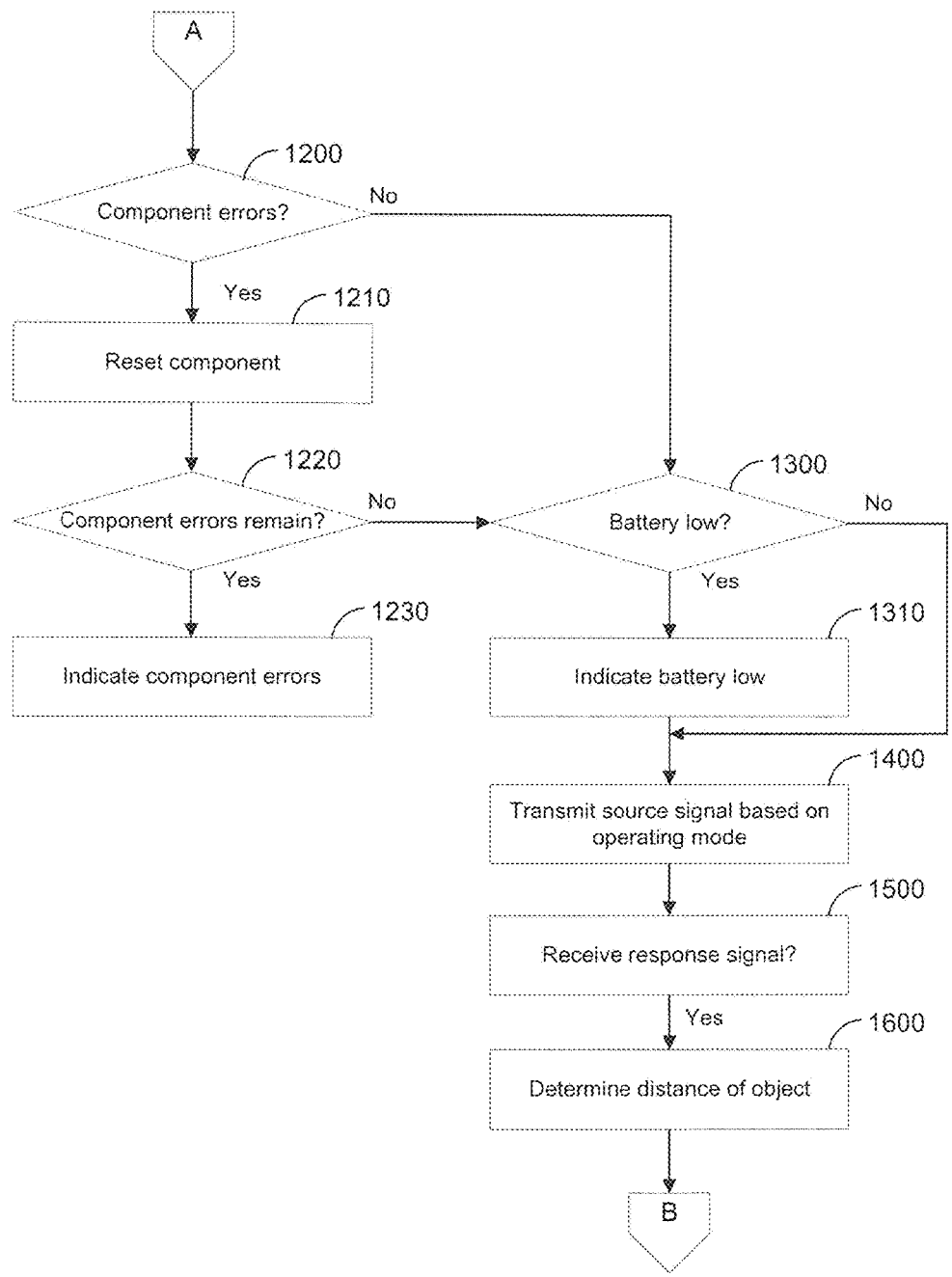
Figures 3, 13:
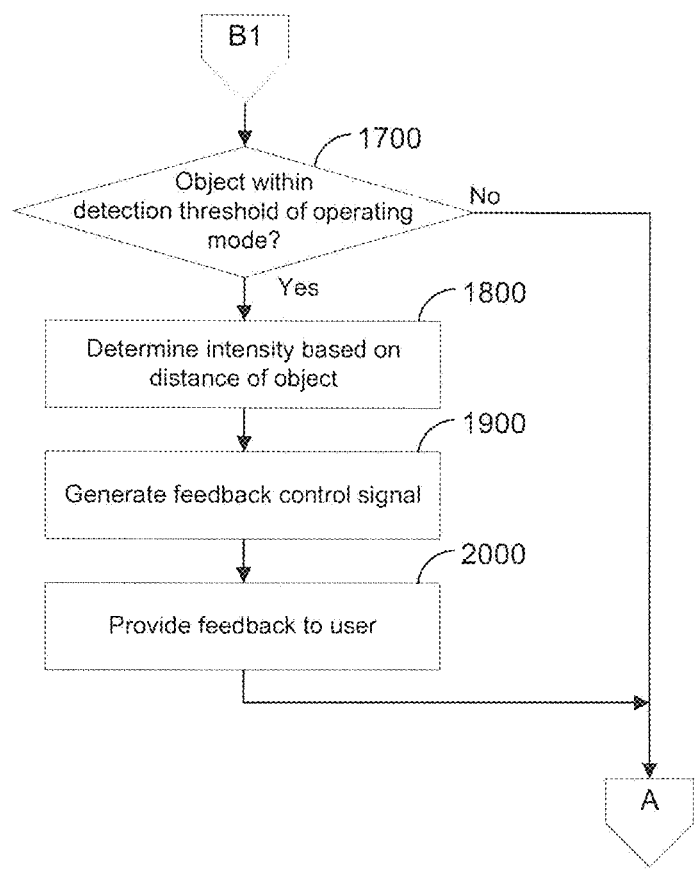
Figures 4, 13:
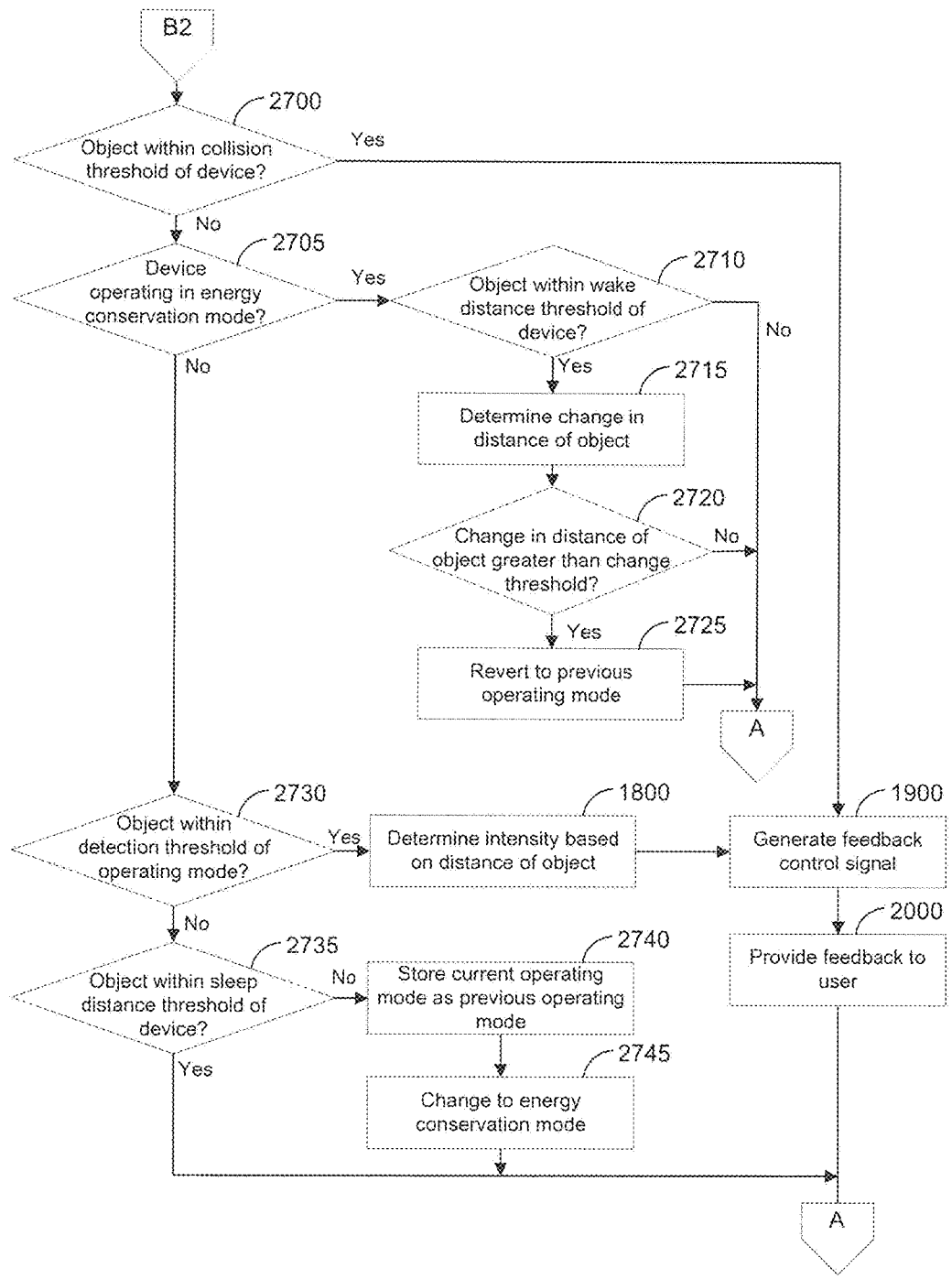
Figure 14:
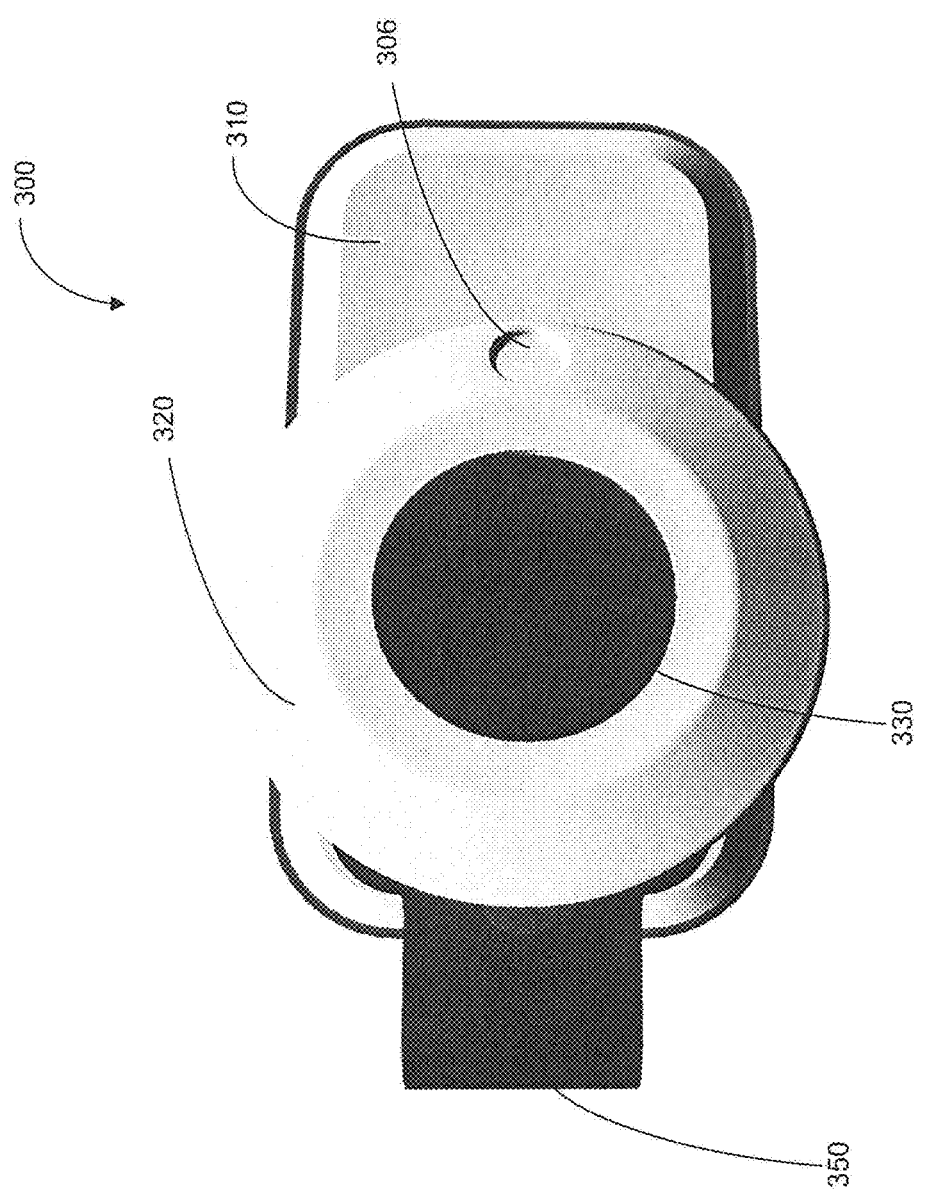
FIG. 14 is a top view of the electronic device of another example embodiment of an electronic device for detecting objects.

Reference will now be made to FIGS. 13-1 to 13-4, which together, show flowcharts of example methods for operating an electronic device, such as the electronic device 100, for detecting potential objects in the vicinity of a user of the electronic device. The method begins at act 1000 when the user manipulates the selection mechanism 105 to power on the electronic device 100.

At 1010, once power is supplied to the circuit components, the processing unit 195 may indicate to the user that the electronic device 100 has been turned on. The processing unit 195 may provide the indication by generating a feedback control signal (step 1900) or generating a device status signal, or both. The transducer 155 may be configured to receive the feedback control signal and indicate that the electronic device 100 is powered on by providing a certain type of feedback to the user. For example, two quick consecutive vibrations by the transducer 155 comprised of a vibrator motor 160 may indicate that the electronic device 100 has been powered on.

In some embodiments, a light source may also be configured to receive the device status signal and indicate that the electronic device 100 is powered on. Similarly, two quick consecutive flashes by the light comprised of an LED may indicate that the electronic device 100 has been powered on.

At 1100, the user manipulates the selection mechanism 105 to select an operating mode for the electronic device. The electronic device 100 is configured to operate in a plurality of operating modes. In at least one embodiment, the plurality of operating modes includes a "near distance detection mode" and a "far distance detection mode".

In each detection mode, the electronic device 100 provides feedback to the user of the electronic device 100 when potential objects are detected based on a detection threshold for that operating mode. The detection threshold is a distance value. The near distance detection mode typically has a lower detection threshold than the far distance detection mode. For example, in the near distance detection mode, the electronic device 100 may provide feedback to the user of the electronic device 100 when a potential object is detected within 1 meter of the user by setting the value for the detection threshold to 1 meter. In the far distance detection mode, the electronic device 100 may provide feedback to the user of the electronic device 100 when a potential object is detected within a 3 meters by setting the detection threshold to be 3 meters.

In at least one embodiment, the far distance detection mode may also be implemented to reduce the power consumption of the electronic device 100 during operation. For example, in the far distance detection mode, the electronic device 100 may transmit source signals at a lower frequency than the near distance detection mode. Thus, the power consumption of the far distance detection mode may be lower than that of the near distance detection mode.

In at least one embodiment, the user may configure the plurality of operating modes from a computing device when the electronic device 100 is connected to the computing device via the connection port 165. Each operating mode may include a plurality of parameters such as the detection threshold and the source signal frequency. The user may configure each of the plurality of parameters within respective maximum and minimum parameters of the electronic device 100.

In at least one alternative embodiment, the plurality of operating modes includes a first distance detection mode and a second distance detection mode and the user may configure the detection threshold of each of the first distance detection mode and the second distance detection mode. The source signal frequency of each of the first distance detection mode and the second distance detection mode may not be configurable in some cases.

In at least one embodiment, acts 1000 and 1100 may be a single step. As shown in FIGS. 3 to 11, a single selection mechanism 105 may be provided that both, powers the electronic device 100 on and off and also controls the operating mode and a certain operating mode (such as the near distance detection mode) may be selected as a default operation mode upon powering up the electronic device 100. In other embodiments, the electronic device 100 may provide two separate selection mechanisms 105*a* and 105*b* or a single selection mechanism 105 operated in a plurality of ways. Thus, acts 1000 and 1100 may be separate as shown in FIG. 13-1 depending on the embodiment of the electronic device.

At act 1110, the processing unit 195 may indicate the current operating mode of the electronic device 100. The processing unit 195 may provide an indication of the current operating mode by generating a feedback control signal (i.e. act 1900) or generating a device status signal, or both. When the electronic device 100 is first powered on and thereafter when the operation mode changes, the transducer 155 may be configured to receive the feedback control signal and indicate the operating mode of the electronic device 100. For example, a single, short vibration (e.g. one second) by the transducer 155 comprised of the vibrator motor 160 may indicate that the electronic device 100 has been switched to near distance detection mode and a single, long vibration (e.g. three seconds) may indicate that the electronic device 100 has been switched to far distance detection mode. Alternatively, or in addition thereto, a light source may also be configured to receive the device status signal and indicate the operating mode of the electronic device 100.

At act 1200, the processing unit 195 performs error detection on the transceiver 130 and the transducer 155 to ensure that they are operating properly. If an error is detected, the processing unit 195 may reset the component at act 1210. At act 1220, the processing unit 195 performs error detection again to determine whether the error was cleared by the reset. If the error was not cleared by the reset, the processing unit 195 may provide an indication of an error condition by generating a feedback control signal or generating a device status signal, or both at act 1230. The transducer 155 may be configured to receive the feedback control signal and indicate that the electronic device 100 is not operating properly. However, if the component with an error is the transducer 155, then the transducer 155 may not provide feedback to the user. In at least some embodiments, a light source and/or speaker may also be configured to receive the device status signal and indicate that the electronic device 100 is not operating properly.

If an error was not detected at act 1200, or if an error was detected and subsequently cleared by the reset at act 1220, the processing unit 195 may monitor the status of the electrical energy storage component 190 at act 1300. If the processing unit 195 determines that the status of the electrical energy storage component 190 is lower than an electrical energy storage component warning threshold at act 1300, then the processing unit 195 may warn the user of the status of the electrical energy storage component 190 at act 1310. This determination may involve measuring a current or voltage of the electrical energy storage component 190 and comparing the measurement to a corresponding threshold. The processing unit 195 may generate a feedback control signal or generate a device status signal, or both at act 1310 to indicate the status of the electrical energy storage component 190. The transducer 155 may be configured to receive the feedback control signal and warn that the electrical energy storage component 190 of the electronic device 100 has a low status. In alternative embodiments, a light source and/or a speaker may also be configured to receive the device status signal and warn the user that the electrical energy storage component 190 of the electronic device 100 has a low status.

At act 1400, the electronic device 100 generates and transmits a source signal having pulses. Generally, pulse signals are used for lower power consumption and less interference from the outside environment. For example, with an infrared sensor, use of pulsed source signals significantly reduces the likelihood of signal corruption from solar radiation. The frequency of the pulses in the pulse signal depends on the operating mode of the electronic device 100. When the electronic device 100 is in the far distance detection mode, the processing unit 195 generates pulses at a low frequency. When the electronic device 100 is in the near distance detection mode, the processing unit 195 generates pulses at a high frequency. The pulse signal is sent as an input to the transceiver 130. The transceiver 130 then generates the source signal based on the pulses in the received pulse signal, and transmits the source signal in the vicinity of the user.

When the source signals are reflected by a potential object in the vicinity of the user, the transceiver 130 may receive the reflected source signal (e.g. a response signal) at act 1500. The transceiver 130 outputs a representation of any received reflected source signals as the response signal to the processing unit 195.

At act 1600, the processing unit 195 determines whether there are any potential objects in the vicinity of the user and if potential objects are detected the processing unit 195 may further determine the distance of the potential object to the user. To determine the distance of the potential object, the processing unit 195 considers the transmitted pulse frequency based on the operating mode and the time difference between transmission of source signals at act 1400 and reception of corresponding reflected source signals at act 1500. The processing unit 195 may also store the determined distance of the potential object in memory.

In at least one embodiment, after act 1600, the method proceeds to act 1700 (see FIG. 13-3), where the processing unit 195 compares the distance of the potential object to a detection threshold of the operating mode. For example, at step 1600, the processing unit 195 may determine that distance of the potential object is 2 meters. At act 1700, if the electronic device 100 is operating in the near distance detection mode with a detection threshold of 1 meter, then the processing unit 195 will not generate a feedback control signal and the method returns to act 1200. At act 1200, the processing unit 195 begins another iteration of detecting objects. If the electronic device 100 is operating in the far distance detection mode with a detection threshold of 3 meters, then the method will proceed to act 1800.

At act 1800, the processing unit 195 determines an intensity level for the feedback. The intensity level may depend on the distance of the potential object to the user. The intensity level may increase as the distance of the potential object relative to the user decreases. For example, if the distance of the potential object falls between the detection thresholds of the near distance detection and far distance detection operating modes, the processing unit 195 may determine that the feedback control signal will have the minimum intensity level. If the distance of the potential object is lower than the detection threshold of the near distance detection mode, the processing unit 195 may determine that the feedback control signal will have an intensity level that is higher than the minimum intensity level. The intensity level may be increased the closer the potential object gets to the user, up to a maximum intensity level. The minimum and maximum intensity levels may be parameters configured by the user. Furthermore, the minimum and maximum intensity levels may be configured for each operating mode.

At act 1900, the processing unit 195 generates the feedback control signal for the detected potential object. The transducer 155 is configured to receive the feedback control signal and, at act 2000, indicate to the user of the electronic device 100 that a potential object is detected within the detection threshold of the operating mode. After act 2000, the method returns to act 1200. By returning to act 1200 after act 2000, the processing unit 195 continues operating the electronic device 100 in the detection mode. At act 1200, the processing unit 195 begins another iteration of detecting objects.

In at least one embodiment, the electronic device 100 provides collision prevention. When collision prevention is provided, the electronic device 100 provides feedback to the user of the electronic device 100 when potential objects are detected within a collision threshold for that device. The collision threshold is similar to a detection threshold except that the collision threshold does not change with the operating mode. The collision threshold may warn users of an imminent collision. The collision threshold may be a distance value. For example, the electronic device 100 may provide feedback to the user of the electronic device 100 when a potential object is detected within 50 centimeters, which is approximately arms' length, of the user by setting the value of the collision threshold to 50 centimeters. Any appropriate distance value may be used.

When collision prevention is provided, after act 1600, the method proceeds to act 2700 (see FIG. 13-4), where the processing unit 195 compares the distance of the potential object to the collision threshold. For example, at act 1600, the processing unit 195 may determine that the distance of the potential object is 30 centimeters. At act 2700, if the collision threshold is 50 centimeters, the processing unit 195 determines that the potential object is within the collision threshold and the method will proceed to act 1900, where the processing unit 195 will generate a feedback control signal to indicate that a collision may occur. If at act 1600, the processing unit 195 determines that the distance of the potential object is 75 centimeters, then the processing unit 195 determines that the potential object is not within the collision threshold and a feedback control signal is not generated at act 2700. Instead, the method proceeds to act 2705.

The feedback control signal that is generated in response to a potential object within the collision threshold may uniquely identify that a potential object is detected within the collision threshold by having a particular actuation pattern that is not generated under any other conditions. For example, the feedback control signal that is generated in response to a potential object within the collision threshold may consist of three pulses in quick succession.

In at least one embodiment, the electronic device 100 provides energy management of the electrical energy storage component 190. When energy management of the electrical energy storage component 190 is provided, the processing unit 195 may operate the electronic device 100 in an energy conservation mode. The energy conservation mode may be provided to reduce the power consumption of the electronic device 100 during operation. In the energy conservation mode, circuit components remain powered but the electronic device 100 may transmit source signals at a lower frequency than in the detection modes. For example, the period between source signals transmitted in the energy conservation mode may be 300 milliseconds while the period between source signals transmitted in the detection modes may be 50 milliseconds. Thus, the power consumption of the energy conservation mode may be lower than that of the detection modes.

The electronic device 100 may operate in the energy conservation mode when no potential objects are detected within a sleep distance threshold. That is, the electronic device 100 may operate in the energy conservation mode when the distance of a detected potential object is greater than the sleep distance threshold. The sleep distance threshold may be a distance value. For example, the electronic device 100 may operate in the energy conservation mode when the distance of a detected potential object is greater than 3 meters. Any appropriate distance may be used for the sleep distance threshold.

In at least one embodiment, the electronic device 100 may discontinue operating in the energy conservation mode when potential objects are detected within a wake distance threshold. That is, the electronic device 100 may discontinue operating in the energy conservation mode when the distance of a detected potential object is less than the wake distance threshold. The wake distance threshold may be a distance value. For example, the electronic device 100 may discontinue operating in the energy conservation mode when the distance of a detected potential object is less than 3 meters. Any appropriate distance may be used for the wake distance threshold.

In at least one embodiment, the electronic device 100 may also discontinue operating in the energy conservation mode any time the user manipulates the selection mechanism 105 while the electronic device 100 is in the energy conservation mode. When the electronic device 100 discontinues operating in the energy conservation mode, the electronic device 100 may continue operating in the last detection mode prior to the current instance of the energy conservation mode. Other suitable conditions for operating in or discontinuing in the energy conservation mode may be used in alternative embodiments.

When energy management of the electrical energy storage component 190 is provided, the method proceeds to act 2705. At act 2705, the processing unit 195 determines if the electronic device 100 is operating in energy conservation mode. If the electronic device 100 is operating in energy conservation mode, the method proceeds to act 2710. If the electronic device 100 is not operating in energy conservation mode, the method proceeds to act 2730.

At act 2710, the processing unit 195 compares the distance of the potential object to a wake distance threshold of the device. For example, at act 1600, the processing unit 195 may determine that the distance of the potential object is 3.2 meters. At act 2710, if the wake distance threshold is 3 meters, the processing unit 195 determines that the potential object is not within the wake distance threshold and the method will proceed to act 1200. By returning to act 1200 after act 2710, the processing unit 195 continues operating the electronic device 100 in the energy conservation mode. At act 1200, the processing unit 195 begins another iteration of detecting objects. If at act 1600, the processing unit 195 determines that the distance of the potential object is 2.8 meters, then the processing unit 195 determines that the potential object is within the wake distance threshold and the method proceeds to act 2715.

In this example, the processing unit 195 determines whether additional conditions for discontinuing in the energy conservation mode are met. At act 2715, the processing unit 195 determines the difference between the distance of the potential object and the previous distance of the potential object. That is, the processing unit 195 determines the change in distance of the potential object from the last distance determined.

At act 2720, the processing unit 195 compares the change in distance of the potential object against a change threshold. The change threshold may be a pure distance value (e.g. scalar). A change threshold that is a pure distance value may be suitable for a user wearing the electronic device 100 on their upper body and having a habit of rocking their upper body back and forth prior to moving again after a period of being stationary. The pure distance value may correspond to a typical distance traveled by the upper body in the backward and forward motion of rocking, for example, 10 centimeters. Upon detecting the backward and forward motion via the change in distance of a potential object, the electronic device 100 may discontinue operating in the energy conservation mode.

For example, at act 2715, the processing unit 195 may determine that the magnitude of the change in distance of the potential object is 5 centimeters. If the change threshold is 10 centimeters, then the processing unit 195 at act 2720 determines that the potential object has changed by a distance less than the change threshold and the method returns to act 1200. By returning to act 1200 after act 2720, the processing unit 195 continues operating the electronic device 100 in the energy conservation mode. At act 1200, the processing unit 195 begins another iteration of detecting objects. However, if the magnitude of the change in distance of the potential object is 15 centimeters, then the processing unit 195 at act 2720 determines that the potential object has changed by a distance greater than the change threshold and the method proceeds to act 2725.

At act 2725, the processing unit 195 reverts to operating the electronic device 100 in the operating mode immediately prior to the current operating mode. That is, the processing unit 195 discontinues operating the electronic device 100 in the energy conservation mode. The processing unit 195 reverts to the detection mode that immediately preceded the current energy conservation mode. After act 2725, the method returns to act 1200. By returning to act 1200 after act 2725, the processing unit 195 begins detecting objects in the detection mode that immediately preceded the energy conservation mode. At act 1200, the processing unit 195 begins another iteration of detecting objects.

The change threshold may further include a direction. For example, −10 centimeters may indicate 10 centimeters closer and +10 centimeters may indicate 10 centimeters further. When the change threshold comprises a distance value and a direction, at act 2720, the processing unit 195 may further compare whether the change in distance of the potential object is closer or further away. For example, if the change threshold is −10 centimeters and the change in distance is 15 centimeters further (e.g. +15 centimeters), then the processing unit 195 determines that the potential object is further away and the method returns to act 1200. By returning to act 1200 after act 2720, the processing unit 195 continues operating the electronic device 100 in the energy conservation mode. At act 1200, the processing unit 195 begins another iteration of detecting objects. However, if the change in distance is 15 centimeters closer (e.g. −15 centimeters), then the processing unit 195 determines that the potential object is closer and has changed by a distance greater than the change threshold, and then the method proceeds to act 2725.

Act 2730 is similar to act 1700, where the processing unit 195 compares the distance of the potential object to a detection threshold of the operating mode. If the processing unit 195 determines that the distance of the potential object is within the detection threshold of the operating mode, the method proceeds to act 1800. However, if the processing unit 195 determines that the distance of the potential object is not within the detection threshold of the operating mode, the method proceeds to act 2735.

At act 2735, the processing unit 195 compares the distance of the potential object to a sleep distance threshold of the device. For example, at act 1600, the processing unit 195 may determine that the distance of the potential object is 1.2 meters. At act 2735, if the sleep distance threshold is 3 meters, the processing unit 195 determines that the potential object is within the sleep distance threshold and the method will return to act 1200. By returning to act 1200 after act 2735, the processing unit 195 continues operating the electronic device 100 in the detection mode. At act 1200, the processing unit 195 begins another iteration of detecting objects. If at act 1600, the processing unit 195 determines that the distance of the potential object is 3.2 meters, then the processing unit 195 determines that the potential object is not within the sleep distance threshold and the method will proceed to act 2740.

Although not shown in FIGS. 13-1 to 13-4, in at least one embodiment, the processing unit 195 may not proceed immediately to act 2740. The processing unit 195 may delay proceeding to act 2740 for a pre-determined period of time. For example, the processing unit 195 may wait for approximately 0.5 seconds before proceeding to act 2740. During this delay, the electronic device 100 may continue to detect potential objects. If the processing unit 195 determines that the potential objects are not within the sleep distance threshold during the duration of the delay, then the method proceeds to act 2740. However, if potential objects are within the sleep detection threshold at any time during the delay, the method proceeds to act 1200 instead.

At act 2740, the processing unit 195 may store the current operating mode of the electronic device 100 so that the electronic device 100 may determine which detection mode to operate in after discontinuing the energy conservation mode. Storing the current operating mode of the electronic device may not be necessary when the selection mechanism 105 is configured in a state to control the operating mode. After storing the current operating mode of the electronic device 100, the method proceeds to act 2745.

At act 2745, the processing unit 195 operates the electronic device 100 in the energy conservation mode. After act 2745, the method returns to act 1200. By returning to act 1200 after act 2745, the processing unit 195 begins detecting objects in the energy conservation mode. At act 1200, the processing unit 195 begins another iteration of detecting objects.

It will be apparent to the skilled person in the art that when the detection threshold of the operating mode is less than the sleep distance threshold, the processing unit 195 will not operate the electronic device 100 in the energy conservation mode.

Although not shown in FIGS. 13-1 to 13-4, in at least one embodiment, the processing unit 195 may proceed immediately to act 2725 after a potential object is detected within the wake distance threshold at act 2710. That is, the processing unit 195 may discontinue operating in the energy conservation mode when the processing unit 195 determines that the distance of the potential object is less than the wake distance threshold.

Although not shown in FIGS. 13-1 to 13-4, in at least one embodiment, the processing unit 195 may proceed immediately to act 2715 after determining that the electronic device 100 is operating in energy conservation mode at act 2705. That is, the processing unit 195 may determine whether to discontinue operating in the energy conservation mode based on the change in distance of the potential object and irrespective of the distance of the potential object.

As described above, the transducer 155 may comprise the vibrator motor 160, a low current electric pulse generator, a heater resistor, or a combination thereof. When the transducer 155 comprises the vibrator motor 160, the feedback control signal may control at least one of the rotational speed of the vibrator motor 160 and the pulse duration of the signals sent to the vibrator motor 160 and therefore the length of the physical vibration pulses that are directed to the user. When the feedback control signal controls the rotational speed of the vibrator motor, increasing intensity levels may result in operating the vibrator motor at increasing rotational speeds. When the feedback control signal controls the pulse duration of the vibrator motor, increasing intensity levels may result in operating the vibrator motor with increasing pulse durations. In some embodiments, both the rotational speed and pulse durations may be varied according to the intensity for the feedback.

When the transducer 155 comprises a low current electric pulse generator, the feedback control signal may control at least one of the current amplitude and the pulse duration. When the feedback control signal controls the current amplitude of the low current electric pulse generator, increasing intensity levels may result in operating the low current electric pulse generator at increasing current amplitudes. When the feedback control signal controls the pulse duration of the low current electric pulse generator, increasing intensity levels may result in operating the low current electric pulse generator with increasing pulse durations. In some embodiments, both the current amplitude and the pulse duration may be varied according to the intensity for the feedback.

Although not shown in FIGS. 13-1 to 13-4, at any time, the user may manipulate the selection mechanism 105 to power off the electronic device 100. Before power is removed from the circuit components, the processing unit 195 may indicate that the electronic device 100 will be turned off. The processing unit 195 may provide an indication of powering off by generating a feedback control signal or generating a device status signal, or both. Therefore, the transducer 155 may be configured to receive the feedback control signal and indicate that the electronic device 100 will be powered off. For example, three quick consecutive vibrations by the transducer 155 comprised of a vibrator motor 160 may indicate that the electronic device 100 will be powered off. Alternatively, or in addition thereto, the light source may also be configured to receive the device status signal and indicate that the electronic device 100 will be powered off. For example, three quick consecutive flashes by the light source comprised of an LED may indicate that the electronic device 100 will be powered off.

Referring now to FIGS. 14 to 22, shown therein are various view of another example embodiment of an electronic device 300 which may be used to detect potential objects in the vicinity of a user. The electronic device 300 comprises a main body 310, a transceiver arm 320 including a transceiver 330 and selection mechanism 305 (not shown), and a transducer portion 355 (see in FIG. 18) having a transducer arm 370 along with a vibrator motor 360. Similar components are identified by similar reference numerals as was used for electronic device 100 and are not described again.

Figure 22:
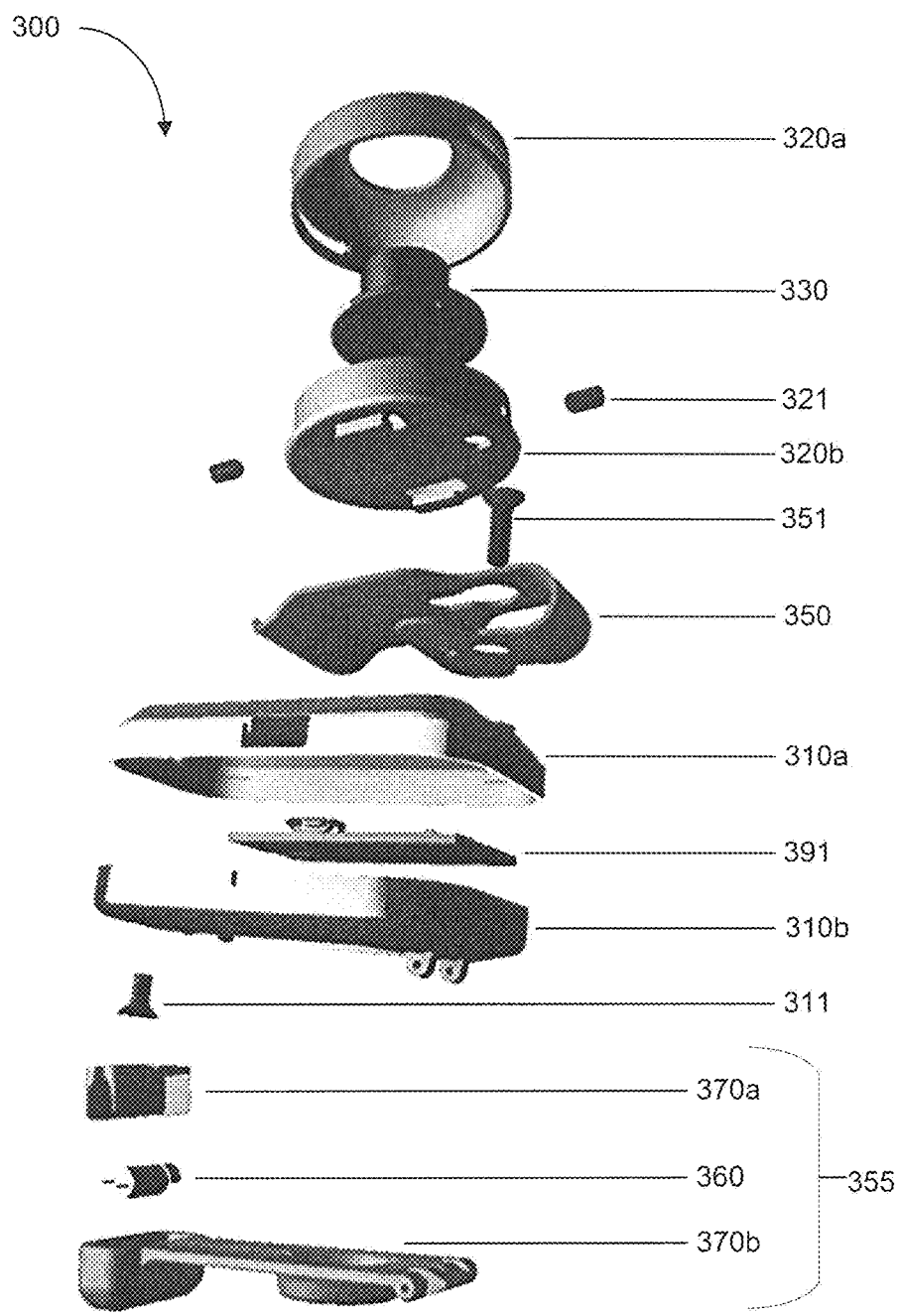
FIG. 22 is an exploded view of the electronic device of FIG. 14.

The main body 310 may be comprised of a main body top element 310a and a main body bottom element 310b (see FIG. 22). The main body top element 310a may be coupled to the main body bottom element 310b using securing mechanism 311 such as a screw or any like means.

In at least one embodiment, the main body may further include a sealing member (not shown) along the junction of the main body top element 310a and the main body bottom element 310b. In other embodiments, the sealing member may be part of an existing element such as the main body top element 310a or the main body bottom element 310b. The sealing member may be formed of tactile material such as, but not limited to, rubber or plastic, for example, to allow a user to grip the electronic device more easily.

Figure 16:
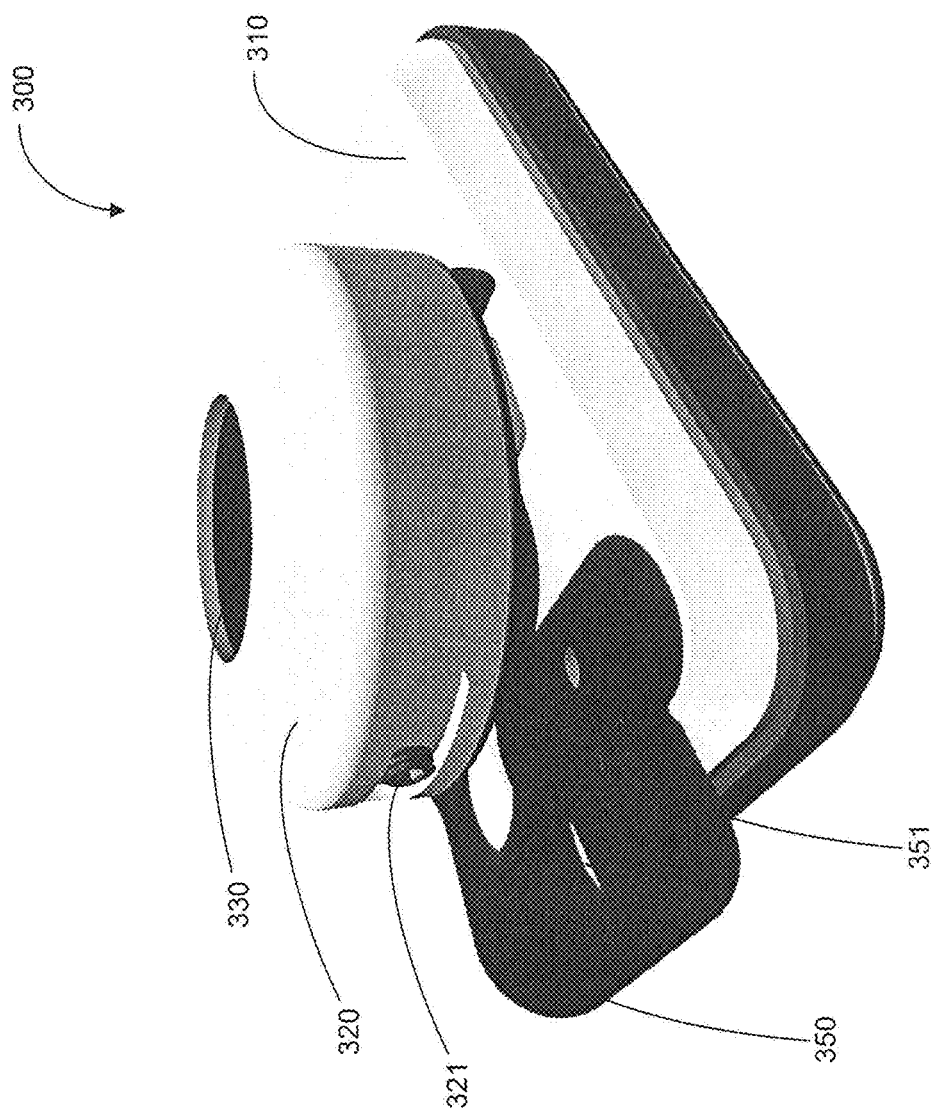
FIG. 16 is a rear perspective view of the electronic device of FIG. 14.

As shown in FIG. 16, the transceiver arm 320 may be pivotally connected to the main body 310 by a spring clip 350 that biases the transceiver arm 120 towards the main body so that the electronic device 310 may clamp to an article of the user. The spring clip 350 may be formed of a rigid material such as, but not limited to, steel, titanium, or other comparable material, for example. The spring clip 350 may be coupled to the main body 310 using securing mechanisms 351 such as a screw or any like means.

As shown in FIGS. 14 to 22, the transceiver arm 320 may be round shaped instead of the elongated shape of transceiver arm 120. The transceiver arm 320 may be comprised of a transceiver arm front element 320a and a transceiver arm back element 320b (see FIG. 22). The transceiver arm front element 320a may be coupled to the transceiver arm back element 120b using fasteners 321 such as screws, or any like means.

The selection mechanism 305 (not shown) may be disposed within the transceiver arm 320. In this example, the selection mechanism 305 may be a slide switch. The transceiver arm front element 320a has a round shape, such as a dial, and is coupled to the selection mechanism 305 so that rotating the transceiver arm front element 320a operates the selection mechanism 305. The transceiver arm front element 320a may have a recession 320c (see FIGS. 18 and 19) around the securing mechanism 321 to enable the transceiver arm front element 320a to rotate while the transceiver arm back element 320b remains stationary. FIGS. 23A to 23C show the selection mechanism 305 in three different states indicated by the position of the selection mechanism indicator 306 with respect to the main body 310. Similar to the selection mechanism indicator 106, the selection mechanism indicator 306 may include a tactile surface. In at least another example, the selection mechanism may be a rotary switch disposed on the transceiver arm 320. In at least one example, the rotary switch may be a rotary potentiometer switch.

Figure 17:
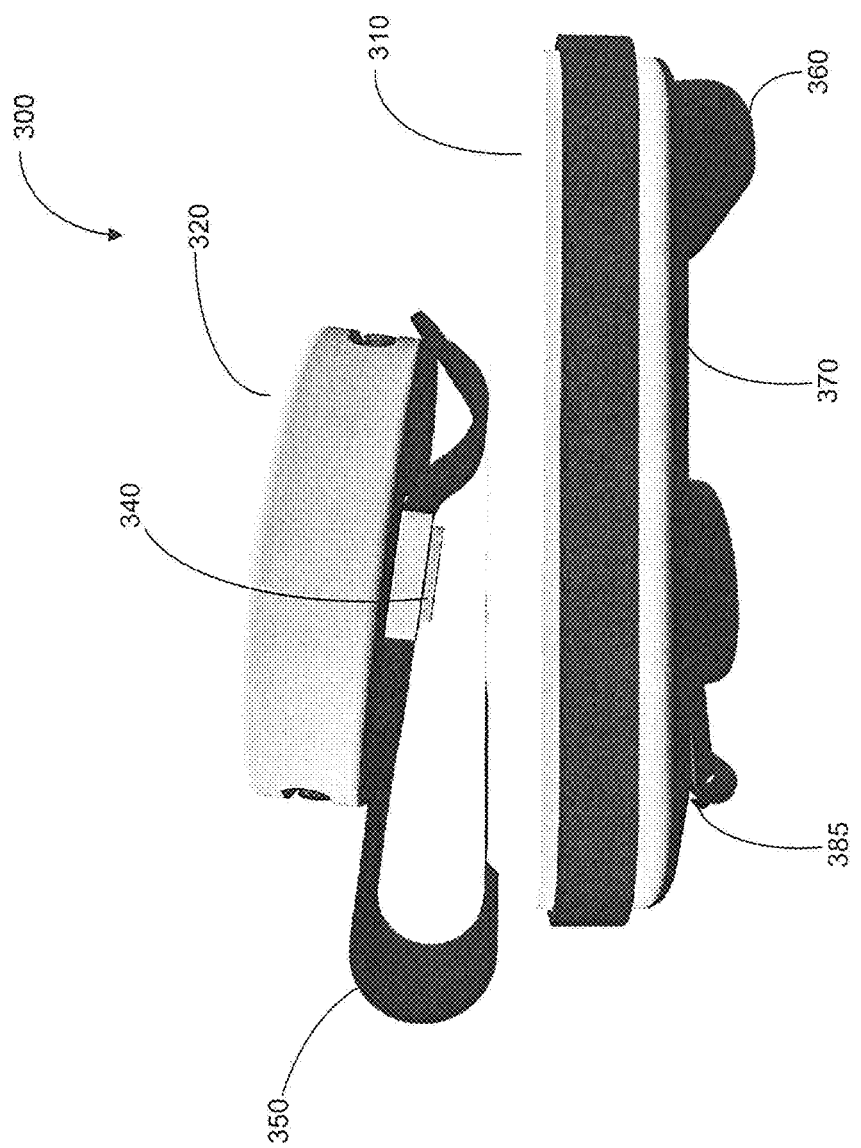
FIG. 17 is a side view of the electronic device of FIG. 14 with the transducer arm in the retracted position relative to the main body.
Figure 18:
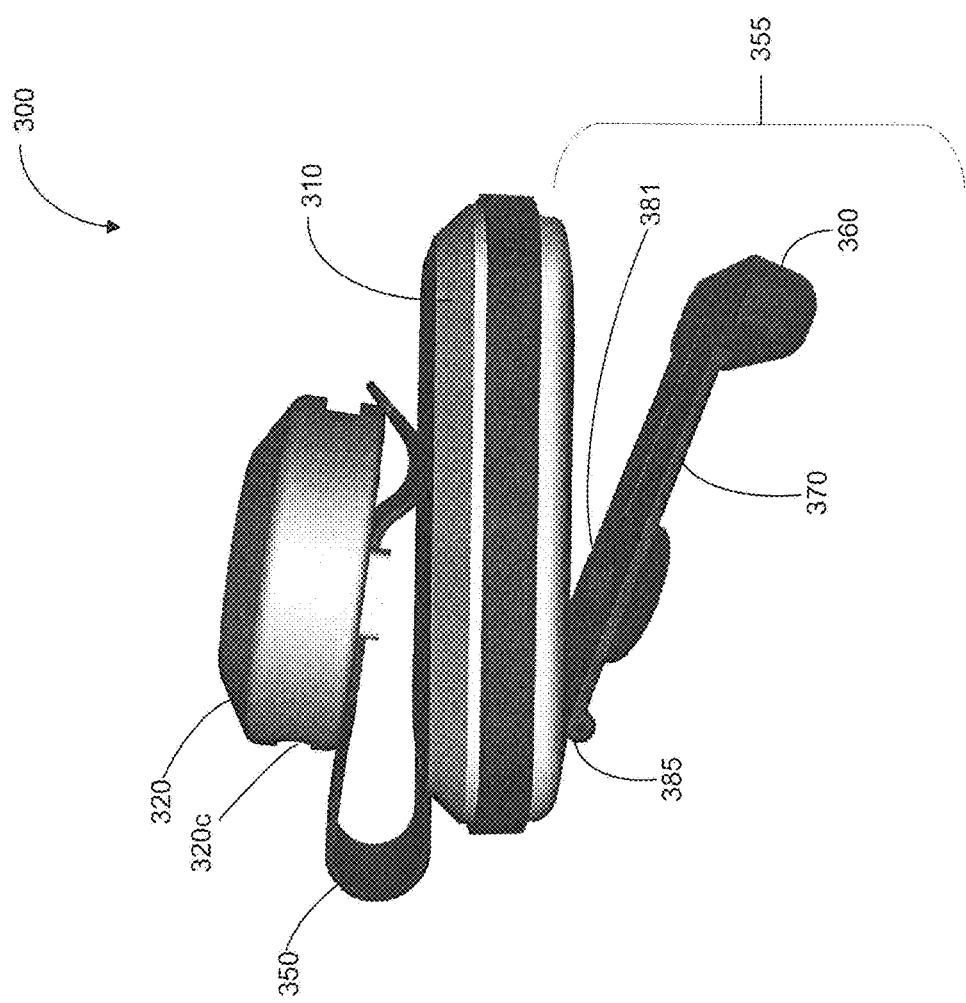
FIG. 18 is a side view of the electronic device of FIG. 14 with the transducer arm in an extended position relative to the main body.
Figure 19:
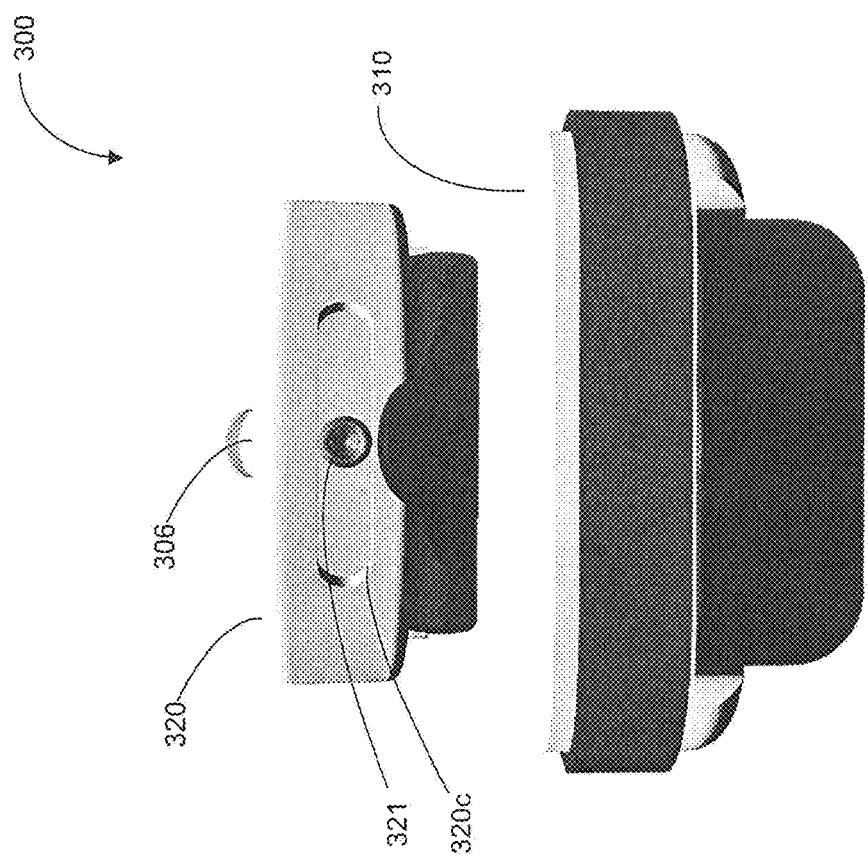
FIG. 19 is a front end view of the electronic device of FIG. 14.
Figure 20:
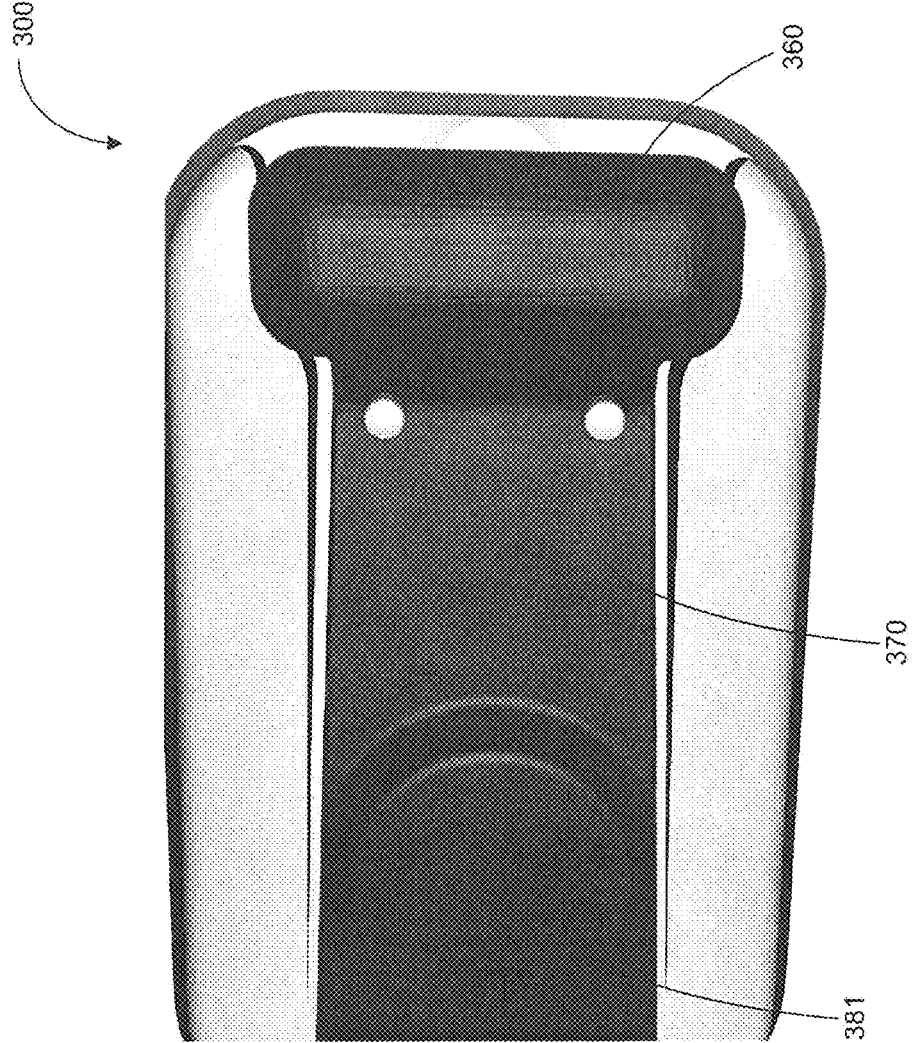
FIG. 20 is a bottom view of a portion of the electronic device of FIG. 14.
Figure 21:
FIG. 21 is side view of a portion of the electronic device of FIG. 14 with the compression spring shown.

The surface of the transceiver arm 320 that faces the main body 110 may comprise a textured surface pattern 340 (see FIG. 17). Similar to the textured surface pattern 140, the textured surface pattern 340 may be used to provide a better grip on the article of the user when the electronic device 110 is clamped to the article of the user. In an alternative embodiment, the only the surface of the main body 310 that faces the transceiver arm 320 may comprise a textured surface pattern.

The cam 385 (see FIG. 18) coupling the transducer arm 370 to the main body 310 may be disposed on the bottom surface of and external to the main body 310. In this example, the transducer arm 370 is spring loaded with a compression spring 380 (see FIG. 21) attached and located in seat 381 of the transducer arm 370 (see FIG. 20).

Figure 15:
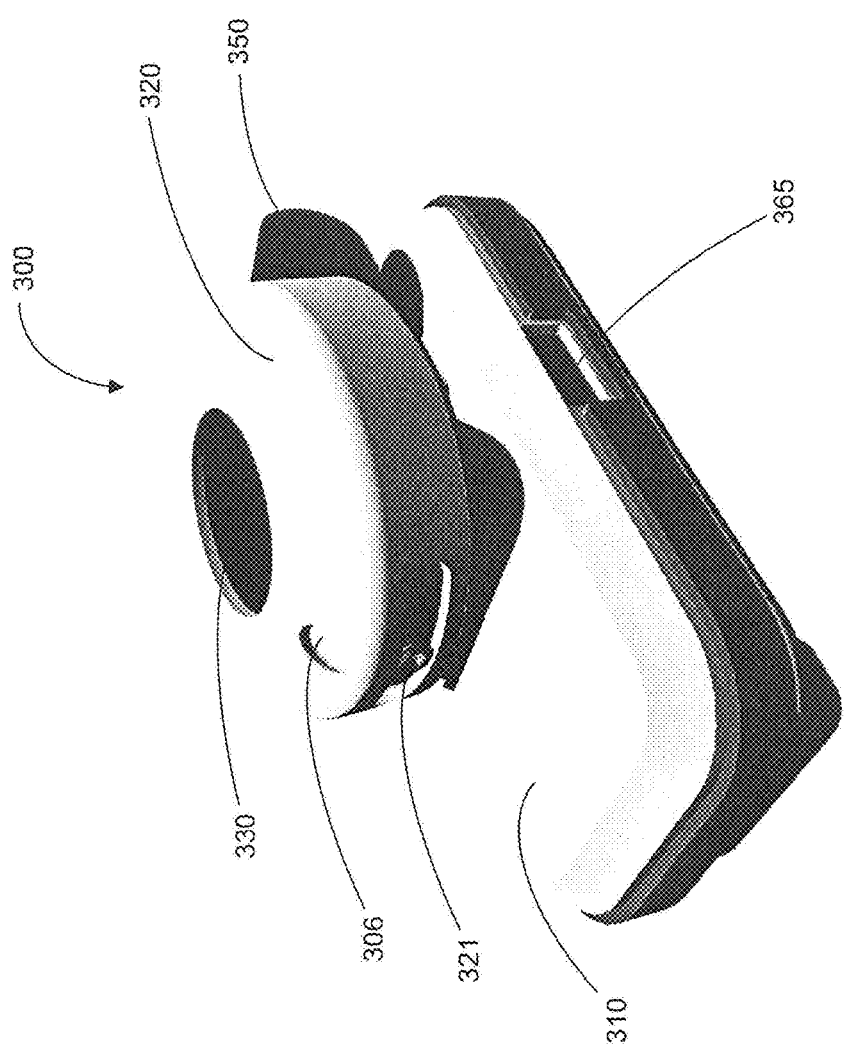
FIG. 15 is a front perspective view of the electronic device of FIG. 14.

As shown in FIG. 15, the main body 310 may house a connection port 365 along a side of the main body 310 instead of the rear or front ends of the main body 110. A printed circuit board 391 may be formed in different shapes to accommodate a desired layout for the various components, such as the location of the connection port 365 or the structure of the main body 310. In one example, the printed circuit board 391 may have a shape that is generally rectangular with rounded corners.

In an example embodiment, the electronic device 300 may have a weight of 61 grams. In this example, the mechanical components including the main body 310 and the spring clip 350 may have a weight of 36 grams and the electronic components including the transceiver 330, the electrical energy storage component 390, the printed circuit board 391, the processing unit 395, and the vibrator motor 360 may have a weight of 25 grams. In this example, the main body 310 may be formed of aluminum. Aluminum may be preferable because of its light weight, scratch-resistance, and durability although other materials may be used in other embodiments.

Numerous specific details are set forth herein in order to provide a thorough understanding of the example embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An electronic device for detecting potential objects in the vicinity of a user of the electronic device, the electronic device comprising:
   a transceiver arm including:
      a transceiver configured to transmit source signals in the vicinity of the user and to receive response signals potentially indicating at least one object in the vicinity of the user;
   a main body that is pivotally connected to the transceiver arm to releasably clamp to
   an article of the user during use, the main body including:
      at least one processing unit for processing the response signals to detect if there is at least one potential object in the vicinity of the user and to generate a feedback control signal indicating when there is at least one detected potential object; and
   a transducer movably coupled to the main body and configured to receive the feedback control signal and provide feedback to the user when the feedback control signal indicates that there is at least one detected potential object in the vicinity of the user.

2. The electronic device of claim 1, wherein the transducer is disposed on at least one transducer arm that is movably coupled to a portion of the main body, the at least one transducer arm being disposed towards the user.

3. The electronic device of claim 2, wherein the at least one transducer arm is configured to isolate the transceiver from the feedback provided by the transducer.

4. The electronic device of claim 2, wherein the at least one transducer arm is coupled to the main body by a spring that biases the at least one transducer arm towards the user and compensates for different articles worn by the user that place the main body at different distances from a portion of the user's body.

5. The electronic device of claim 2, wherein the at least one transducer arm is coupled to the main body with an orientation that prevents an article of the user from gathering between inner surfaces of the at least one transducer arm and the main body that face one another when clamped to the article of the user.

6. The electronic device of claim 2, wherein the transducer is positioned relative to the main body in a location that provides balanced weight distribution of the electronic device when the electronic device is clamped to an article of the user so that the electronic device hangs in a neutral position towards the user.

7. The electronic device of claim 1, further comprising a mechanism to maintain the at least one transducer arm in a locked position relative to the main body.

8. The electronic device of claim 1, wherein the transceiver arm is coupled to the main body by a spring that biases the transceiver arm towards the main body thereby providing a clamping function.

9. The electronic device of claim 1, wherein surfaces of at least one of the transceiver arm and the main body that face one another comprise a textured surface pattern to grip the article of the user therebetween during use.

10. The electronic device of claim 1, wherein the transceiver arm is disposed on the exterior of the article of the user and has a shorter length than the main body so that the transceiver arm is visually discreet.

11. The electronic device of claim 1, wherein the main body further comprises an electrical energy storage component for providing power to circuit components of the electronic device; and the electrical energy storage component is rechargeable by at least one of a wireless mechanism and a wired mechanism.

12. The electronic device of claim 1, wherein the transceiver comprises:
   at least one of an ultrasound transmitter configured to transmit ultrasound waves as the source signals and at least one of an ultrasound sensor for receiving reflected ultrasound waves as the response signals;
   at least one of an infrared transmitter configured to transmit infrared waves as the source signals and at least one of an infrared sensor for receiving reflected infrared waves as the response signals; or
   at least one of a laser transmitter configured to transmit laser pulses as the source signals and at least one of a laser sensor for receiving reflected laser pulses as the response signals.

13. The electronic device of claim 1, wherein:
   the at least one processing unit is configured to operate the electronic device in a current operating mode; the current operating mode comprising one of a plurality of operating modes comprising a first distance detection mode, a second distance detection mode, and an energy conservation mode; and
   the electronic device further comprises a selection mechanism to change the current operating mode to a different operating mode.

14. The electronic device of claim 13, wherein the at least one processing unit is configured to determine a distance of the at least one detected potential object from the electronic device based on the current operating mode of the electronic device and the response signals; and
   the feedback control signal is further modified based on the distance of the at least one detected potential object from the electronic device.

15. The electronic device of claim 14, wherein the at least one processing unit is configured to:
   change the current operating mode to the energy conservation mode when:
      the distance of the at least one detected potential object from the electronic device is greater than a sleep distance threshold; and
      the current operating mode is one of the first distance detection mode and the second distance detection mode; and
   change the current operating mode to one of the first distance detection mode and
   the second distance detection mode when:

the distance of the at least one detected potential object from the electronic device is less than a wake distance threshold; and the current operating mode is the energy conservation mode.

16. The electronic device of claim 13, wherein each operating mode has at least one of a detection threshold, a source signal frequency, a minimum intensity level, and a maximum intensity level configurable by at least one of a wireless mechanism and a wired mechanism.

17. The electronic device of claim 1, wherein the transducer comprises at least one vibrator motor and the feedback control signal is generated to operate the at least one vibrator motor with at least one of an increasing rotational speed and increasing pulse durations when the feedback is provided with an increasing intensity.

18. The electronic device of claim 1, wherein the at least one processing unit is configured to monitor an electrical energy storage status and to generate at least one of the feedback control signal and at least one device status signal when the monitored electrical energy storage status is lower than the at least one device status signal, each device status signal having a property value indicating an electrical energy storage warning threshold.

19. A method for providing feedback when at least one potential object in a vicinity of a user is detected, the method comprising:

providing an electronic device that releasably clamps to an article of the user during use, the electronic device including a first portion and a second portion movably coupled to the first portion;

transmitting, from the first portion of the electronic device, source signals in the vicinity of the user;

receiving, at the first portion of the electronic device, response signals potentially indicating at least one object in the vicinity of the user;

determining if at least one potential object is detected in the vicinity of the user;

generating a feedback control signal when the at least one potential object is detected in the vicinity of the user; and providing feedback, from the second portion of the electronic device, to the user of the device when the feedback control signal indicates detection of at least one potential object in the vicinity of the user.

20. An electronic device for detecting potential objects in the vicinity of a user of the electronic device, the electronic device comprising:

a transceiver configured to transmit source signals in the vicinity of the user and to receive response signals potentially indicating at least one object in the vicinity of the user;

at least one processing unit for generating a feedback control signal indicating when there is at least one detected potential object based on the response signals;

a transducer configured to provide feedback to the user when the feedback control signal indicates that there is at least one detected potential object in the vicinity of the user, the transducer being disposed on at least one transducer arm to provide physical distance between the transducer and the transceiver to isolate the transceiver from the feedback provided by the transducer; and a clipping structure to releasably attach the electronic device to an article of the user during use.

* * * * *